US012770130B2

(12) United States Patent
Killoran, Jr. et al.

(10) Patent No.: US 12,770,130 B2
(45) **Date of Patent: *Oct. 20, 2026**

(54) WEB-BASED CHECKOUT AND ALTERNATE LOGIN BASED ON SECURE IDENTIFIERS AND ALTERNATE LINK FORMATS

(71) Applicant: SWOOP IP HOLDINGS LLC, Wilmington, DE (US)

(72) Inventors: John P. Killoran, Jr., Albuquerque, NM (US); Patrick L. Killoran, Albuquerque, NM (US); Isaiah Baca, Albuquerque, NM (US)

(73) Assignee: SWOOP IP HOLDINGS LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 19/231,275

(22) Filed: Jun. 6, 2025

(65) Prior Publication Data

US 2025/0299178 A1 Sep. 25, 2025

Related U.S. Application Data

(63) Continuation of application No. 18/660,442, filed on May 10, 2024, now abandoned, which is a continuation of application No. 15/360,710, filed on Nov. 23, 2016, now Pat. No. 11,983,696.

(60) Provisional application No. 62/259,923, filed on Nov. 25, 2015.

(51) Int. Cl.

| | |
|---|---|
| ***G06Q 20/32*** | (2012.01) |
| ***G06Q 20/12*** | (2012.01) |
| ***G06Q 20/38*** | (2012.01) |
| ***G06Q 20/42*** | (2012.01) |

(52) U.S. Cl.
CPC ......... *G06Q 20/3255* (2013.01); *G06Q 20/12* (2013.01); *G06Q 20/3226* (2013.01); *G06Q 20/385* (2013.01); *G06Q 20/425* (2013.01)

(58) Field of Classification Search
CPC ............... G06Q 20/3255; G06Q 20/12; G06Q 20/3226; G06Q 20/385; G06Q 20/425
USPC ........................................................... 705/72
See application file for complete search history.

(56) References Cited

U.S. PATENT DOCUMENTS

| | | | |
|---|---|---|---|
| 6,101,485 | A | 8/2000 | Fortenberry et al. |
| 6,167,435 | A | 12/2000 | Druckenmiller et al. |
| 8,538,845 | B2 | 9/2013 | Liberty |
| 8,606,703 | B1 | 12/2013 | Dorsey et al. |
| 8,725,635 | B2 | 5/2014 | Klein et al. |

(Continued)

*Primary Examiner* — Courtney P Jones
(74) *Attorney, Agent, or Firm* — VOLPE KOENIG

(57) ABSTRACT

A method, system, and computer-readable medium are disclosed for improving computer network security using Simple Mail Transfer Protocol (SMTP) and a Quick Response (QR) code to authenticate users prior to granting access to a secure webpage. A vendor system receives a transaction request from a user and obtains a user identifier. The vendor system communicates with an e-commerce system to generate a QR code containing a token and a transaction-specific link. The token is generated based on the user identifier and transaction details. When the user activates the link, an email response is automatically transmitted via SMTP to the e-commerce system, which authenticates the token to verify the user. Upon successful authentication, the e-commerce system notifies the vendor system, which then grants the user access to the secure webpage.

20 Claims, 17 Drawing Sheets

(56) References Cited

U.S. PATENT DOCUMENTS

| | | | |
|---|---|---|---|
| 8,762,272 B1 | 6/2014 | Cozens et al. | |
| 9,189,785 B2 | 11/2015 | Liberty et al. | |
| 9,208,488 B2 | 12/2015 | Liberty | |
| 9,892,386 B2 | 2/2018 | Liberty | |
| 10,395,223 B2 | 8/2019 | Muthu et al. | |
| 10,467,615 B1 | 11/2019 | Omojola | |
| 10,515,345 B2 | 12/2019 | Koh et al. | |
| 2006/0253335 A1 | 11/2006 | Keena et al. | |
| 2007/0255620 A1 | 11/2007 | Tumminaro et al. | |
| 2009/0006233 A1 | 1/2009 | Chembtob | |
| 2009/0171792 A1 | 7/2009 | Mayo | |
| 2010/0070419 A1 | 3/2010 | Vadhri | |
| 2011/0153496 A1 | 6/2011 | Royyuru | |
| 2012/0130898 A1 | 5/2012 | Snyder et al. | |
| 2013/0167208 A1 | 6/2013 | Shi | |
| 2013/0191892 A1* | 7/2013 | Cadden | H04L 9/32 726/5 |
| 2013/0275264 A1* | 10/2013 | Lindenberg | G06Q 20/322 705/26.1 |
| 2014/0025599 A1 | 1/2014 | Killoran | |
| 2014/0067675 A1 | 3/2014 | Leyva | |
| 2014/0143337 A1* | 5/2014 | McIntosh | H04L 61/50 709/204 |
| 2014/0222624 A1 | 8/2014 | Custer | |
| 2014/0279444 A1 | 9/2014 | Kassemi | |
| 2015/0066768 A1 | 3/2015 | Williamson | |
| 2015/0134519 A1 | 5/2015 | Wankmueller | |
| 2015/0302412 A1 | 10/2015 | Bhanoo | |
| 2015/0324796 A1 | 11/2015 | Karamchedu | |
| 2015/0339668 A1* | 11/2015 | Wilson | G06Q 20/40 705/41 |
| 2015/0371221 A1* | 12/2015 | Wardman | G06Q 20/4097 705/67 |
| 2016/0048822 A1 | 2/2016 | Forrest | |
| 2016/0180333 A1* | 6/2016 | Leyva | G06Q 20/42 705/41 |
| 2016/0232525 A1* | 8/2016 | Cateland | G06Q 20/3223 |
| 2016/0232607 A1 | 8/2016 | Spielman | |
| 2017/0024738 A1* | 1/2017 | Vaidyanathan | G06Q 20/10 |

* cited by examiner

260

300

340

370

440

FIG. 8C
SEND
To:payment-id-28FBC5F8-F1C3-43A3-9EBA-6E9FD28575A7@PAYM
CC:
BCC:
Subject:The Store Purchase
475
Send this message to complete this transaction.

470

560

570

600

WEB-BASED CHECKOUT AND ALTERNATE LOGIN BASED ON SECURE IDENTIFIERS AND ALTERNATE LINK FORMATS

CROSS REFERENCE TO RELATED APPLICATION

This application is a continuation of U.S. patent application Ser. No. 18/660,442, filed May 10, 2024, which claims the benefit of U.S. patent application Ser. No. 15/360,710 filed Nov. 23, 2016, which claims the benefit of U.S. Provisional Patent Application No. 62/259,923 filed Nov. 25, 2015, which are incorporated by reference as if fully set forth.

FIELD OF INVENTION

The present invention is related to electronic commerce systems. More particularly, the present invention is a system and method that facilitates electronic commerce and security by using one of Short Message Service (SMS), social media, email with multiple identifiers and alternative link formats.

BACKGROUND

Standard web-based checkouts are cumbersome and complicated to use. These standard checkouts require a customer to remember a password each time they wish to checkout or to login to an account. This deters repeat purchases or requires the customer to stay logged in to their account which is a security risk. Current web-based checkouts require passwords in order to complete transactions. Often these methods are contingent on verification of a single identifier.

Websites are excellent tools for a customer to login and access shopping carts, checkouts, and secure information. However, each new vendor requires the customer to generate password protected accounts if they wish to log in to their account, and therefore the customer is required to remember a password each time they log in. Mediums such as email, SMS, and social media represent environments which are secure and customers rarely log off.

The mailto link is an indispensable tool in email-based checkout. This form of link allows customers to move from one application, such as a SMS or social media, to the email client easily. However there is no way to reverse this sequence.

A system that provides a customer with a web-based checkout feature, but finalizes the checkout process through SMS, email, or social media, would streamline the process for the customer. A system that collects multiple identifiers for a customer and uses those to authenticate online payments, enhances security while eliminating the need for passwords, would be welcome in the marketplace. A system that allows vendors all of the convenience of websites and shopping carts, but paired with the convenience of email, SMS, and social media based login, would be welcome by customers and vendors alike. An alternative form of link, that can trigger the generation of a SMS or social media message, would create new possibilities in messaging, secure login, and payments.

SUMMARY

Customers who wish to use online checkouts or online logins on electronic devices desire a high level of security without sacrificing convenience. Mobile and desktop devices tie together multiple streams of communication such as SMS, social media, and email. Disclosed is a system and method that collects multiple identifiers from customers, such as phone number, email address, and social media account information, for use in online web-based checkouts and online logins. The use of multiple forms of communication provide a higher level of security in the checkout process and allow the secure environment of these media (email, SMS, and social media) as a replacement for a password. Also disclosed is an alternative form of link that would trigger the generation of SMS and social media messages.

A system and method for web-based checkout in an e-commerce system using a secret pin received via Short Message Service (SMS) and using an identifier are disclosed. The system and method include receiving a customer payment request and email address of a customer from a vendor, transmitting a pin to an SMS account of the customer, receiving the pin from the customer to confirm payment, authenticating the IP address and the pin and processing the payment. The system and method include receiving a payment request from a customer and a phone number of the customer, authenticating an IP address of the customer, looking up an account of the customer based on the received phone number, generating a link and token associated with the customer, transmitting the mailto link and token to the customer, receiving an email response from the customer, and processing the payment.

The system and method include a web-based checkout in an e-commerce system using a secret pin that is received via Short Message Service (SMS). The system and method include receiving a customer payment request and email address of a customer from a vendor, transmitting a pin to an SMS account of the customer, receiving the pin as an input from an IP address of the customer to confirm payment, authenticating the IP address and the pin, and processing the payment upon the authenticating being successful. The system and method may include the input from an IP address is via an email from the customer email address. The system and method may also include generating the pin to be provided to the customer and generating a SMS message including the pin to the customer. The SMS account of the customer may be determined based on a phone number associated with the customer. The pin may be valid for a select period of time including one hour or two hours. If the authenticating is unsuccessful, the customer is directed to a sign-up page.

The system and method includes a web-based checkout in an e-commerce system using an identifier. The system and method include receiving a payment request from a customer and a phone number of the customer, looking up an account of the customer based on the received phone number, generating a link and token associated with the customer, transmitting the link and token to the customer, receiving an email response from the customer, the response including the token, authenticating the email and decoding the token, and processing the payment upon the authenticating being successful. The link is a mailto link or a textto link.

The system and method for processing a transaction in an e-commerce system are disclosed. The system and method include receiving a request for an offer from a vendor, generating an alternative link, transmitting the alternative link to a user via an email message, receiving an alternative message response message from the user, authenticating the received alternative response message, and processing the transaction upon the authenticating being successful. The alternative link may be a texto link that triggers the generation of an SMS. The alternative link may be coupled with a token. The alternative response message includes a token and the authenticating includes decoding the token.

BRIEF DESCRIPTION OF THE DRAWINGS

A more detailed understanding may be had from the following description, given by way of example in conjunction with the accompanying drawings wherein.

DETAILED DESCRIPTION

Figure 1:
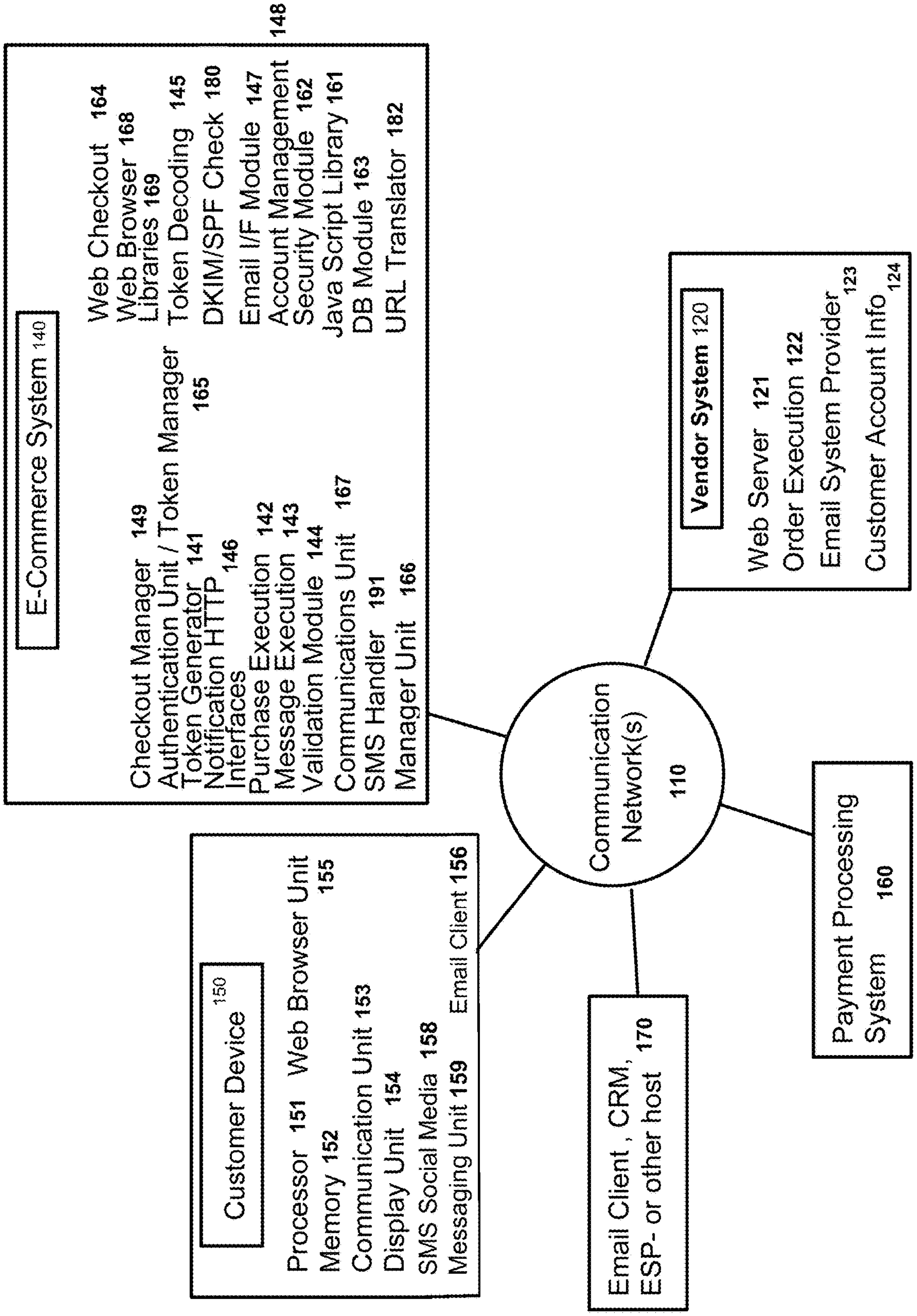
FIG. 1 illustrates a system diagram of an email based e-commerce system that integrates SMS, social media, and email for in online web-based check out and e-commerce payment processing.

All embodiments described below may be used in tandem or in relation to specific vendor needs. They may also be integrated with an email service provider, customer relationship management or directly with a payment processor. Payment processing may occur in any number of ways using multiple gateways, credit cards, debit cards, direct carrier billing and automatic clearing houses. Although the description below focuses on the use of Short Message Service (SMS), email messaging and social media networks may also be used. The configuration of the system may vary based on client needs. A method and apparatus allows the e-commerce system, such as an Email Payment Gateway (also referred to as the e-commerce system), to enable vendors to send emails to customers allowing customers to make payments for specific amounts by selecting mailto links associated with each amount and sending the email to the e-commerce system. Each mailto link holds a token generated by the e-commerce system. The e-commerce system may validate and authenticate the email and decode the token. The system and method solves several problems in relation to management of customer accounts. The e-commerce system provides to vendors a series of controls to manage and streamline the process of registering customers. As shown in FIG. 1, the disclosed methods provide different benefits based on the dynamic nature of the e-commerce system. The e-commerce system offers vendors multiple methods to validate a message based on authenticating identifiers and tokens, and the categorization of these emails into registered and unregistered customers.

The embodiments described below may also be integrated with an email service provider, customer relationship management, or directly with a payment processor. Payment processing may occur in any number of ways using multiple gateways, banks, credit cards, debit cards, gift cards, direct carrier billing, automatic clearing houses, or virtual currency. Although the description below focuses on the use of email, Short Message Service (SMS), and social media networks may also be used. Although some examples and discussion herein generally use SMS, other texting formats may be substituted for SMS including Extensible Markup Language (XMPP), Session Initiation Protocol (SIP), Voice over Internet Protocol (ViOP), multimedia messaging service (MMS), Messaging Queuing Telemetry Transport (MQTT), and Apple Push Notification Service (APNS) used in services such as Whatsapp, Viber, Facebook Messenger, iMessage and other forms Internet Telephony Protocols. The configuration of the system may vary accordingly.

An e-commerce system 140 to facilitate transactions between a customer and a vendor 120 is disclosed. FIG. 1 illustrates a system diagram of an email based e-commerce system 140 that integrates SMS, social media, and email for in online web-based check out and e-commerce payment processing. A method and apparatus allows the e-commerce system 140, such as an Email Payment Gateway, to enable customers to log in to secure accounts via a series of messages authenticated in different media. The example system 100 shown in FIG. 1 may be used for e-commerce transactions. The example system 100 includes a vendor system 120, an e-commerce system 140, a customer device 150, a banking server (not shown), an email service provider 170, and a payment processing system 160 160 that may communicate over one or more wired and/or wireless communication network 110. The wired or wireless communication network 110 may be public, private or a combination of public or private networks.

The customer device 150 may be, for example, a cellular phone, a smartphone, a desktop computer, a laptop computer, a tablet computer, or any other appropriate computing device. The customer device 150 may utilize short message service (SMS) messages, multimedia messaging service (MMS), social media apps, web browsing, and or email. For example, social media apps may include Facebook, Twitter, Google Plus+, LinkedIn, Instagram, Pinterest, Swapchat, Tumblr, and the like. The customer device 150 includes a processor 151, memory 152, a communications unit 153, a display unit 154, a web browser unit 155, which may communicate data to/from the web server module(s) in the vendor server 120 and payment server 140, email client 156, a SMS social media unit 158 and a messaging unit 159. The web browser unit 155 may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit 155 may implement Rich Internet Application (RIA) and/or multimedia technologies such as ADOBE FLASH and/or other technologies compatible with Internet based communications. The web browser unit 155 may implement RIA and/or multimedia technologies using one or web browser plugin modules (e.g., ADOBE FLASH), and/or using one or more sub-modules within the web browser unit 155 itself. The web browser unit 155 may display data on one or more display devices (not depicted) that are included in, or connected to, the customer device 150, such as a liquid crystal display (LCD) display or monitor. The customer device 150 may receive an input from a user from an input device (not depicted) that is included in, or connected to, the customer device 150, such as a keyboard, a mouse, a microphone or a touch screen, and provide data that indicates the input to the web browser unit 155.

The vendor system 120 may include a web server 121, order execution unit 122, an email system provider 123 and customer account info 124. The vendor system may be substituted for a financial management system as illustrated in the examples described herein.

The web server 121 provides a website that may be accessed by a customer device 150. The web server 121 may implement HTTP protocol, and may communicate Hypertext Markup Language (HTML) pages and related data from the website to/from the customer device 150 using HTTP. The vendor server 120 may be connected to one or more private or public networks (such as the Internet), via which the web server 121 communicates with devices such as the customer device 150. The web server 121 may generate one or more web pages, may communicate the web pages to the customer device 150, and may receive responsive information from the customer device 150.

The web server 121 may be, for example, an NGINX server, an APACHE HTTP server, a SUN-ONE Web Server, a MICROSOFT INTERNET Information Services (IIS) server, and/or may be based on any other appropriate HTTP server technology. The vendor server 120 may also include one or more additional components or modules (not depicted), such as one or more load balancers, firewall devices, routers, switches, and devices that handle power backup and data redundancy.

The vendor system 120 may also include one or more additional components or modules (not depicted), such as one or more load balancers, firewall devices, routers, switches, and devices that handle power backup and data redundancy.

The order execution unit 122 is configured to receive instructions included in received messages and executes orders on behalf of the vendor system 130.

The memory may be configured to store information associated with e-commerce transactions. This may include inventory information, information used to generate web pages, customer information, and other e-commerce data.

The e-commerce system 140 may include a token generator 141, a purchase execution module 142, a message execution module 143, a validation module 144, a database module 163, a token decoder 145, a notification HTTP module 146, an email interface module 147, an account management unit 148, checkout manager 149, web checkout 164, JAVA script library 161, a security module 162, authentication unit/token manager 165, manager unit 166, communications unit 167, web browser 168, libraries 169, DKIM/SPF check 180, a Universal Resource Locator (URL) translator 181, and a manager unit 166. While only one vendor system 120 is shown communicating with the e-commerce system 140, this is shown as an example only. The e-commerce system 140 may communicate with an internal or external email service provider (ESP) 170 and an internal or external payment processing system 160. The e-commerce system 140 may communicate with multiple vendor systems 120.

Similarly, vendors may register with the e-commerce system 140. The e-commerce system 140 may provide the vendor system 120 with a public key and private key to be used in token transaction in accordance with the methods described herein. When a transaction is attempted (e.g. for invoices and payments), the e-commerce system 140 decodes the token, authenticates the sender of the email, which may allow the transaction to be processed. While the e-commerce system 140 is depicted as a separate entity in FIG. 1, this is shown as an example only. The e-commerce system 140 may be controlled and/or co-located with the vendor system 130, and/or the email service provider 170.

The token generator 141 may generate tokens for use in e-commerce transactions. Tokens may be encrypted or plain text strings which contain information to perform a transaction when sent to the e-commerce system 140. A token may be one or multiple encrypted strings, files, passwords, cyphers, plain text or other data which may contain information used to perform or authenticate a transaction. While FIG. 1 shows the token generator 141 as being a part of the e-commerce system 140, it may be hosted by any trusted party with access to the private key. For example, the banking server may include a token generator 141. A token may include one or more of the following parameters or other parameters not listed below:

Private-key: The private key provided by the e-commerce system 140.

Public-key: E-commerce system's 140 public key, provided by the e-commerce system 140.

Auth-key: Any additional data that may be used to authenticate the transaction, including, but not limited to, biometric identification, location data and other fraud detection systems.

Partner-id: The partner ID given provided by the e-commerce system 140.

Environment: The environment the vendor wants to generate buttons for. This distinguishes whether the token is being used in a testing environment or in the live environment (and running real transactions).

Type: The type of token to generate (e.g. bulk, email-targeted, etc.). There are multiple types of tokens that a token generator 141 may generate and decode. For example, site tokens may be used for website transactions, email tokens for minimum-of-clicks email payments, and universal tokens for email validations.

Card: The card token associated with the recipient of this token. When a customer is registered with the e-commerce system 140, the vendor receives a credit card token-a unique identifier that references the specific card associated with that customer and vendor. When the vendor is generating a token to submit to e-commerce system 140, they may include the card token as a customer identifier.

Email: The email associated with the receipt of this token.

URL: The Signup URL the recipient may go to if customer doesn't have payment information registered with e-commerce system 140.

Amount: The amount a customer should be charged for the transaction the token is generated for.

User-data: Data to pass back as a reference. This data may include custom data that the vendor may want to pass through the e-commerce system 140 and receive back when a transaction has completed. It may include an item reference number or SKU, customer address, or other piece of data that is not required by e-commerce system 140 to complete a transaction, but that the vendor wants associated with that transaction.

Expires: Expiration date for token, integer value of seconds since epoch.

Header-user-agent: The HTTP_USER_AGENT from the request header. HTTP headers are sent as part of a request from a customer's web browser unit within customer device 150 for a piece of information. These headers define the parameters that the web browser unit is expecting to get back. The user-agent is the identifier of the software that is submitting the request-typically the identifier of the web browser unit that is requesting the content.

Header-accept-language: The HTTP_ACCEPT_LANGUAGE from the request header. The accept-language is the acceptable language for the response—e.g. the language in which the web browser unit is requesting the content be sent back.

Header-accept-charset: The HTTP_ACCEPT_CHARSET from the request header. The accept-charset is the character sets that are acceptable for the response—e.g. the character set in which the web browser unit is requesting the content be sent back.

IP-address: The IP address of the token recipient.

In one example, a bulk token may omit the card and email fields, thereby allowing for the tokens to be shared. Additionally, or alternatively, a bulk token may include the card field and/or email field but the e-commerce system 140 may be configured to ignore those fields and/or other fields based on the type field.

The purchase execution module 142 facilitates the execution of payments between a customer and a vendor.

The message execution module 143 is configured to analyze received messages and communicate with the token decoder 145 to determine if the received message is valid and to identify the request embedded in the message (e.g. request for purchase of goods.) If the token decoder 145 indicates the token is valid, the message execution module 143 may then access the account management unit 148 to verify a transaction.

The database module 163 serves as a database to store information that may be accessed by the e-commerce system 140.

The token decoder 145 may be configured to decode tokens received from external sources, such as a vendor system 120 or a customer device 150.

The validation module 144 may serve to authenticate received emails, using the DomainKeys Identified Mail (DKIM) and/or Sender Policy Framework (SPF) protocols. For example, SPF allows a domain owner to add a file or record on the server that the recipient server cross-checks. Similarly, DKIM may be used to embed information within the email. While these specific validation/authentication protocols are discussed herein, any known validation/authentication protocol may be used and the use of the DKIM/SPF protocol is used only to enhance the understanding of the reader by using a specific possible validation/authentication protocol.

Generally, SPF is an email validation system designed to detect email spoofing by providing a mechanism to allow receiving mail exchangers to check that incoming mail from a domain is being sent from a host authorized by that domain's administrators. The list of authorized sending hosts for a domain may be published in the Domain Name System (DNS) records for that domain in the form of a specially formatted TXT record. Sender Policy Framework is described in IETF publication RFC 7208, which is incorporated by reference as if fully set forth.

The Simple Mail Transfer Protocol (SMTP) permits any computer to send an email claiming to be from any source address. SPF allows the owner of an Internet domain to specify which computers are authorized to send email with sender addresses in that domain, using Domain Name System (DNS) records. Receivers verifying the SPF information in TXT records may reject messages from unauthorized sources before receiving the body of the message.

The sender address is transmitted at the beginning of the SMTP dialog. If the server rejects the sender, the unauthorized client should receive a rejection message, and if that client was a relaying message transfer agent (MTA), a bounce message to the original sending address may be generated. If the server accepts the sender, and subsequently also accepts the recipients and the body of the message, it should insert a Return-Path field in the message header in order to save the sender address.

Generally, DKIM is an email validation system designed to detect email spoofing by providing a mechanism to allow receiving mail exchangers to check that incoming mail from a domain is authorized by that domain's administrators. A digital signature included with the message may be validated by the recipient using the signer's public key published in the DNS. DKIM is the result of merging DomainKeys and Identified Internet Mail. Prominent email service providers implementing DKIM include Yahoo, Gmail, AOL and FastMail. Any mail from these organizations should carry a DKIM signature.

More specifically, both, signing and verifying modules are usually part of a mail transfer agent (MTA). The signing organization may be a direct handler of the message, such as the author, the originating sending site or an intermediary along the transit path, or an indirect handler such as an independent service that provides assistance to a direct handler. In most cases, the signing module acts on behalf of the author organization or the originating service provider by inserting a DKIM-Signature: header field. The verifying module typically acts on behalf of the receiver organization.

DKIM is independent of Simple Mail Transfer Protocol (SMTP) routing aspects in that it operates on the RFC 5322 message—the transported mail's header and body—not the SMTP envelope defined in RFC 5321. Hence, the DKIM signature survives basic relaying across multiple MTAs. DKIM allows the signer to distinguish its legitimate mail stream. This ability to distinguish legitimate mail from potentially forged mail has benefits for recipients of e-mail as well as senders, and "DKIM awareness" is programmed into some e-mail software.

The "DKIM-Signature" header field, by way of example, may include a list of "tag=value" parts. Tags are short, usually only one or two letters. The most relevant ones are b for the actual digital signature of the contents (headers and body) of the mail message, bh for the body hash, d for the signing domain, and s for the selector. The default parameters for the authentication mechanism are to use SHA-256 as the cryptographic hash and RSA as the public key encryption scheme, and encode the encrypted hash using Base64. The receiving SMTP server uses the domain name and the selector to perform a DNS lookup. For example, given the signature:

DKIM-Signature: v=1; a=rsa-sha256; d=example.net; s=brisbane;
c=relaxed/simple; q=dns/txt; l=1234; t=1117574938; x=1118006938;
h=from:to:subject:date:keywords:keywords;
h=MTIzNDU2Nzg5MDEyMzQ1Njc4OTAxMjMONTY3ODkwMTI=;
b=dzdVyOfAKCdLXdJOc9G2q8LoXSlEniSbav+yuU4zGeeruD00lszZVoG4ZHRNiYzR.

A verifier queries the TXT resource record type of brisbane._domainkey.example.net. The selector is a straightforward method to allow signers to add and remove keys whenever they wish—long lasting signatures for archival purposes are outside DKIM's scope. Some more tags are visible in the example:

v is the version,
a is the signing algorithm,
c is the canonicalization algorithm(s) for header and body,
q is the default query method,
l is the length of the canonicalized part of the body that has been signed,
t is the signature timestamp,
x is it's expire time, and
h is the list of signed header fields, repeated for fields that occur multiple times.

The DKIM-Signature header field itself is always implicitly included in h.

The data returned from the verifier query is also a list of tag-value pairs. It includes the domain's public key, along with other key usage tokens and flags. The receiver may use this to then decrypt the hash value in the header field and at the same time recalculate the hash value for the mail message (headers and body) that was received. If the two values match, this cryptographically proves that the mail was signed by the indicated domain and has not been tampered with in transit.

Signature verification failure does not force rejection of the message. Instead, the precise reasons why the authenticity of the message may not be proven should be made available to downstream and upstream processes. Methods for doing so may include sending back a message, or adding an Authentication-Results header field to the message as described in RFC 7001, which is incorporated as if fully set forth.

While DKIM and SPF protocols are discussed herein, validation module 144 may perform any authentication and validation type protocols. DKIM and SPF are used to provide examples of such validation protocols that may be performed in validation module 144.

The notification HTTP module 146 delivers notices of events to external systems, such as an HTTP endpoint the vendor configures to update their internal database when a transaction is executed.

An email interface module 147 may be configured to parse emails for action by the e-commerce system 140.

The account management unit 148 is configured to manage accounts registered with the e-commerce system 140. A customer or vendor, wishing to complete a transaction with an e-commerce system 140 may register his/her email address and payment information with the e-commerce system 140. The account management unit 148 may be configured to store a customer registry and a vendor registry.

The security module 162 may be configured to perform additional security measures to prevent unauthorized access to the system or fraud.

The email service provider 170 may be associated with the vendor system 120, the e-commerce system 140, or may be a third party entity. The email service provider 170 may be configured to provide email marketing services. The email service provider 170 may further be configured to provide tracking information showing the status of email sent to each member of an address list. The email service provider 170 may further be configured to segment an address list into different interest groups or categories to send targeted information. The email service provider 170 may also parse messages based on the secondary system of email-targeted tokens. The email service provider 170 may also be configured to send trigger emails based on responses from the vendor system 120 or customer behavior. The email service provider 170 may further be configured to create or use templates generated by the e-commerce system 140. The templates may be used for sending information to contacts. Email service provider 170 may include a customer interface that allows a customer to adjust the template or it may be integrated with external sources (e.g. vendor system 120 or e-commerce system 140). The email service provider 170 may comprise a send engine (not shown), which allows vendors to distribute their message that may be received by one or more customer device(s) 150. The email service provider 170 may further include a tool for generating mailto links, graphic buttons, and tokens. The email service provider 170 may be configured to dynamically customize the content of emails that are sent out, to tailor personalized information and mailto links.

The banking server (not shown) may be controlled by a third party system bank. The e-commerce system 140 may communicate with the banking server to verify that the customer has adequate funds or credit for the requested payment. For example, the banking server may be a controlled by VISA, AMERICAN EXPRESS, MASTERCARD or any other banking or financial network that a customer may use for online payment. The banking server may be an automatic clearing house services (ACS). The banking server may be an interface for a centralized or decentralized virtual currency system or protocol such as frequent flyer miles, "reward" points, or Bitcoin.

The email-based e-commerce system 140 may allow vendors to send advertising emails or bills with a mailto link associated with a specific product offer (or payment amount) and select the mailto link and generate a response email by selecting the mailto link. This response email contains a token and is addressed to the e-commerce system 140. Once sent, this response email confirms the customer's payment for the product (or prepayment of a bill) by parsing the information in the token. The e-commerce system 140 processes the payment and notifies the vendor system 120 and the customer device 150. The e-commerce system 140 may comprise a token generator 141 as well as components for processing the tokens and components for processing the payments and a system for notifying the vendor system 120 of the transaction details.

The functionality of the offer, mailto link, and response email is described in U.S. Pat. No. 9,152,980 which issued on Oct. 6, 2015 entitled EMAIL-BASED E-COMMERCE, which is a continuation of U.S. Pat. No. 8,775,623 which issued on Jul. 8, 2014 entitled SYSTEM AND METHOD FOR EMAIL-BASED E-COMMERCE, and U.S. Pat. No. 9,058,591 which issued on Jun. 16, 2015 entitled EMAIL- BASED DONATIONS, which applications are incorporated by reference as if fully set forth.

Referring back to the example system in FIG. 1, the payment processing system 160 may be an independent third party operated unit, it may be located in the e-commerce system 140 or the vendor system 120.

While the example system shown in FIG. 1 shows the e-commerce system 140 comprising the token generator 141, this is shown as an example only. The vendor system 120 may also include a token generator 141 that allows vendors to directly create tokens. In another example, a third party may have a token generator 141 to create tokens for use by the vendor system 120.

System 100 may not require the vendor system 120 to host the token generator 141 on their system. System 100 uses the web browser's ability to transmit a message securely between two frames of a page and validating the URLs of those two pages.

Mailto links in the email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a "blind" copy of the new message should be sent; a field that indicates the subject of the new message; and a field that indicates the body of the new message. The mailto links may be defined according to the format described in Internet Engineering Task Force (IETF) RFC2368, which is incorporated by reference as if fully set forth herein. The mailto link may be accessed with a corresponding short URL.

The e-commerce system 140 may include a database of registered customers, such as for payment processing. The e-commerce system 140 may identify a customer by their email address and may decode tokens included in the content of an email and process payments based on the data in the token. A vendor that is associated with the e-commerce system 140 may send emails with the tokens generated for processing by the e-commerce system 140. When generating tokens, a related URL checkout page with a matching offer is generated. This allows vendors via vendor system 120 to send emails with payment options, including payments for product offers, donations, services and gift cards, for example, with each offer associated with a token and a URL checkout page. The token is associated with a mailto link. A customer may activate the mailto link by selecting (or "clicking on") the link and send the message to the e-commerce system 140. The e-commerce system 140 may then identify the email address and decode the token. If the e-commerce system 140 determines that the email address is not registered in the database, the e-commerce system 140 sends an email back to the customer with a URL link that is a checkout. This checkout is prepopulated based on the customer's mailto link selection based on the content of the token. The URL captures the payment information and registry information. The e-commerce system 140 updates the database once the new customer is registered. In future transactions, the email address of the customer is identified as registered by the e-commerce system 140 and the payment is processed exclusively through an email payment gateway.

An email-based e-commerce system 100, as described herein, allows an email payment opportunity. This may include an email advertisement offering a product or service which is sent to customers and contains one or more mailto links. Each mailto link may relate to an item (e.g. service or product). If the mailto link is selected by a customer, an email message associated with an item or items is generated. Within that generated email message is a token that includes encoded information such as the purchase amount, the merchant, or an item identifier. The information contained in the token includes details for both the completion of email transaction and details that provide context and direction for the process of completing a transaction when the details included within the token are not sufficient. This may include details about the composition of a page to collect more information from the customer (where the required fields and information about those fields are stored directly in the token), a pointer to a location where the composition of a page to collect more information is stored (where the required fields and information about these fields are indirectly referenced by data in this token for retrieval at a later time), or a pointer or description of a routine to execute in case of failures (e.g. a response email in the case of product unavailability). This mailto link may be generated by a vendor through a web interface tool, or by using the e-commerce system 100 to programmatically create either the token or the full mailto link.

For a customer to complete an email transaction, the customer's payment information may be contained in the email e-commerce system database 163. In order to determine if the customer's payment information is in database 163 the token may be decoded to recognize the customer when the email arrives at the e-commerce system 140. The vendor sends the first email via the vendor system 120. The customer via customer device 150 responds by activating a mailto link by sending the response to the e-commerce system 140. If the customer is registered and the incoming email is authenticated, when the token is decoded, the transaction is processed.

If the customer is not registered, a web checkout page may be needed. Additional information may be encoded within the email token that describes a web checkout page for the email offer. The vendor's email may thereby serve multiple purposes. One enables the email to perform as an email payment, if the customer is registered, and another enables the unregistered customer to be sent a web checkout 164. The web checkout 164 may be prepopulated with additional information based on the customers' original selection that is decoded from the token. The additional information included within the token identifies remote resources, which may include an input display and validation components. The remote resource may function as a plugin, as a reference to information stored in a database, or as a hook into the execution of an independent function.

When the web checkout 164 page is being loaded by the customer, the input display may provide the requirements for displaying the field on the form, including field name, entry box length, and other properties of the input field.

When the form has been filled out by the customer and is submitted, these form fields are sent to the validation resource to confirm that the information entered meets the formatting, length, data type, and any other requirements of the field. If validation resource returns a "pass" condition for the form, submission continues to the e-commerce system 140. If the validation resource returns a "fail" condition for any data on the form, error messaging may be displayed to the customer, to enable correction of the one or more particular inputs that were identified as incorrect and resubmission again.

These remote resources may be created to describe standard information that may be used across numerous merchants, or they may be used to define custom information that may be used for a single merchant.

Using this system 100, a vendor via vender system 120 may not be required to expend additional computer programming effort because it relies on the email e-commerce system 140. If the offer web page is linked to the email purchase opportunity, the vendor may not be required to modify any existing systems or processes to register customers with the email e-commerce system 140. The vendor may not need to segment their email lists into registered and unregistered customers and the customers are not aware of the distinction within the content of the email. The distinction between customers occurs by virtue of the system relieving both the vendor and the customer of any excess choices or distinctions. The vendor may create offers manually via a web interface, and the email e-commerce system 140 may handle the aspects of the transaction, from receiving the order request, facilitating the payment processing, storing relevant transaction data, sending a receipt, and displaying transaction data to the vendor.

The vendor may integrate directly with an API. The vendor may maintain existing payment flows separate from their email e-commerce solution, or the vendor may use the email e-commerce system as a full-featured payment system for both web and email transactions without doing any software development. Presenting the customer with a clear process that seamlessly migrates the customer to adopt an email-based checkout process eases the customer into a new technology where transactions happen by email instead of on a URL. This system 100 provides a vendor with a more automated or customized way of handling elements that may be achieved through the use of the email e-commerce system 140.

The disclosed methods provide different benefits based on the dynamic nature of the e-commerce system 140. The e-commerce system 140 offers vendors 120 multiple methods to hold and transfer funds via email, SMS, or social media message. The e-commerce system 140 also offers a flexible configuration of the system allowing the vendor 120 or other third party to hold desired parts of the system in the vendor system 120. For example, token generation which is depicted in FIG. 1 as being held by the e-commerce system 140 may be held by another party. When the vendor 120 registers with the e-commerce system 140 they may be offered different levels of service and the vendor 120 may choose the configuration required.

Figure 2:
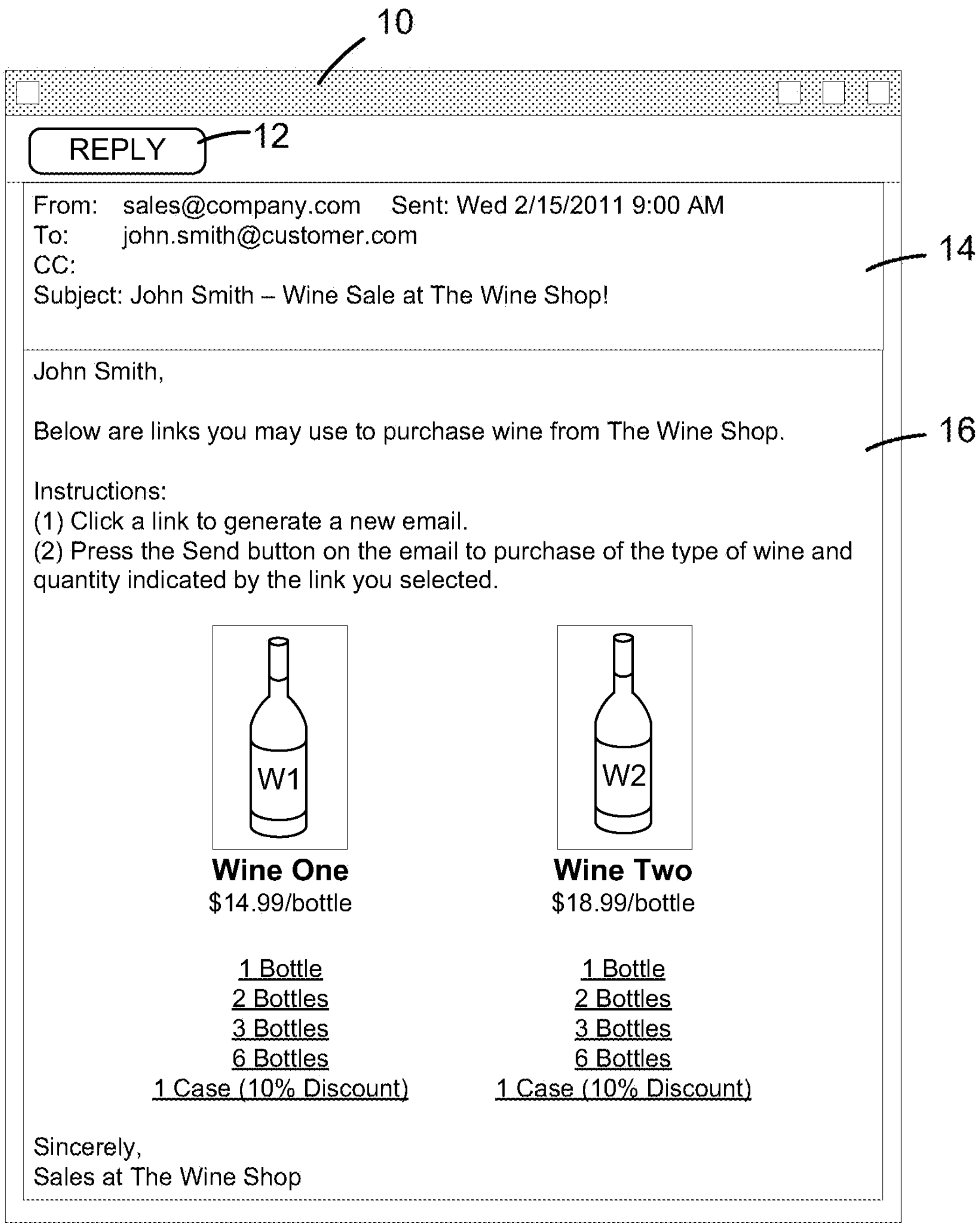
FIG. 2 illustrates an example email message that solicits the purchase of goods from a vendor.

FIG. 2 illustrates an example email message that solicits the purchase of goods from a vendor. FIG. 2 shows an email display window 10 that may be used by the email client module of customer device 150 to display a first example email message from the message processing module. The email display window 10 may include a reply button 12, a control area 14, and a message body area 16. The control area 14 may display control and/or header information associated with the email message, such as the email addresses of the sender and recipient of the message. According to this example, the control area 14 shows that the sender of the message has the email address "sales@company.com." This is an email address that may be associated with an account used by the e-commerce system 140 for the communication of email messages. Further to this example, the control area 14 shows that the email address of the example recipient of the message (John Smith) is "john.smith@customer.com." The control area 14 may also display information such as a subject of the email message and the time the email message was sent. The reply button 12 may respond to user input to generate a new display element (not depicted) to respond to the email message.

The message body area 16 may display the body of the email message. As shown in FIG. 2, the message body area 16 may display an example email message that shows information related to two example products (Wine One and Wine Two) that are being offered for sale by an example vendor (The Wine Shop). The message body area 16 includes a picture of a bottle of each type of wine, as well as the price for a bottle of each type of wine. The message body area 16 also includes, under the picture of the bottle of Wine One, a number of mailto links, such as the "1 Bottle," "2 Bottles," "3 Bottles", "6 Bottles," and "1 Case (10 percent Discount)" links. The message body area 16 also includes similar links under the picture of the bottle of Wine Two. These links may be defined according to the mailto URI scheme or other appropriate format, and each may describe a new email message that may be generated by the email client module of customer device 150 when that link is selected.

The "1 Bottle" link beneath the picture of the Wine One bottle may include information that, if selected, generates an email message that, if received by the e-commerce system 140, will indicate to the e-commerce system 140 that John Smith may like to purchase one bottle of Wine One. As a further example, Wine One may have a product identifier of "0005," and John Smith may have a customer identifier of "0777." According to this example, the "1 Bottle" link may describe an email message that is addressed to an email account that is associated with the e-commerce system 140, and that includes a message body that includes the identifier for John Smith ("0777"), an identifier of the selected product ("0005"), and an identifier of the quantity that John Smith may like to order (in this example, a single bottle). Alternatively or additionally, the email message described by the link may include information such as text that describes the order, an identifier of the vendor (in this example, The Wine Shop), an email campaign identifier, and/or other information. Similarly, the "2 Bottles" link beneath the picture of the Wine One bottle may include information that describes an email message that, if received by the e-commerce system 140, will indicate to the e-commerce system 140 that John Smith may like to purchase two bottles of Wine One. According to this example, the "2 Bottles" link may be defined as follows:

<a href="mailto:sales@company.com?subject=Purchase percent 20from percent 20Wine percent 20Shop percent 20 and body=You percent 20have percent 20created percent 20an percent 20order percent 20for percent 20two percent 20bottles percent 20of percent 20Wine percent 20One. percent 20Press percent 20the percent 20Send percent 20button percent 20to percent 20complete percent 20the percent 20order. percent 0A percent 0AProductID0005 percent 20QualifierNA percent 20Qty0002 percent 20CustomerID0777 percent 20CampaignID0003" target="_blank">2 Bottles</a> mailto:sales@company.com?Subject="Press send to pay $42.99 to Wine Shop"? body="TEXT XXX-XXX-XXX-XXX"

In addition, the token identifier may be part of the To: address, or any other portion of an address field, or the address field itself. This token may be, for example, of the form: ex: mailto:payment-id-XXX-XXX-XXX@payments.atpay.com?Subject="Press send to pay $42.99 to Wine Shop"?body="TEXT". Once this token identifier reaches the e-commerce system 140, the e-commerce system 140 may perform a look-up of the actual token in order to parse the offer details. This process is described in greater detail below.

Similarly, the "3 Bottles," "6 Bottles," and "1 Case (10 percent Discount)" links beneath the picture of the Wine One bottle indicate corresponding information for three bottles, six bottles, and one case of bottles, respectively. Additionally, the "1 Bottle," "2 Bottles," "3 Bottles," "6 Bottles," and "1 Case (10 percent Discount)" links under the Wine Two bottle indicate corresponding information for Wine Two as that described above with respect to the mailto links relating to Wine One.

The email client module of customer device 150 may receive a user input that indicates that one of the links displayed in the message body area 16 is selected. The user input may be, for example, a mouse click, keyboard input, or any other type of input that indicates that a link is selected. The email client module of customer device 150 may, in response to this user input, generate and display an order email message as specified by the selected link.

Figure 3:
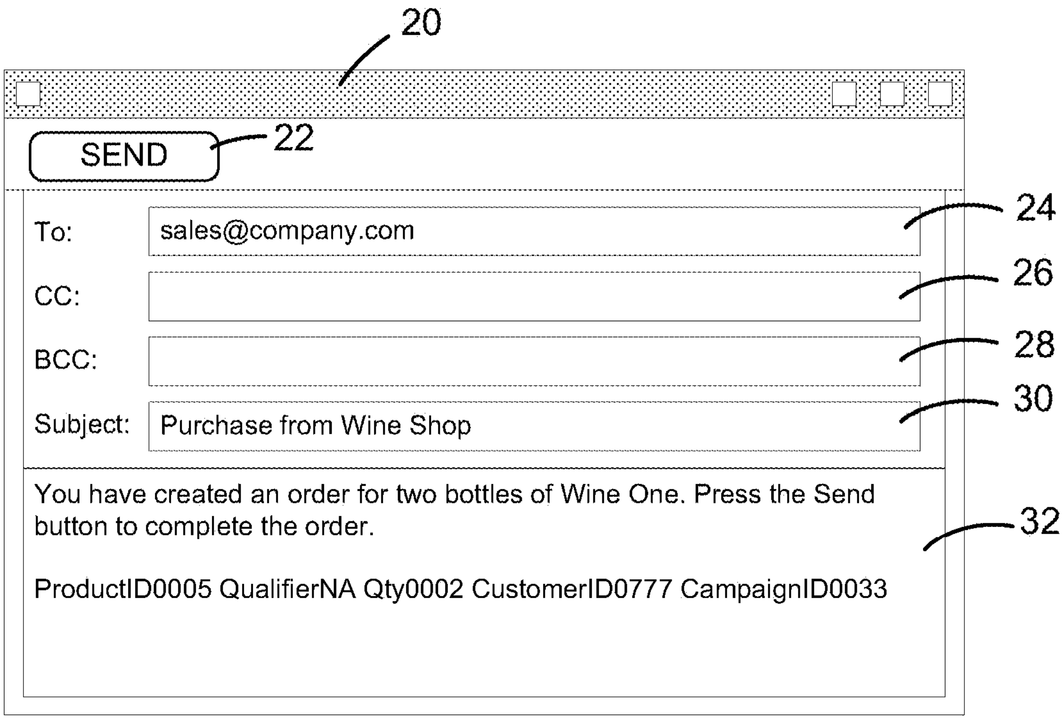
FIG. 3 illustrates an email message for placing an order.

FIG. 3 illustrates an email message for placing an order. FIG. 3 shows an example message composition window 20 that may be displayed in response to a selection of a link from the message body area 16 of the email display window 10 of FIG. 2. The message composition window 20 of FIG. 3 may include a Send button 22, a To area 24, a CC area 26, a BCC area 28, a Subject area 30, and a message body area 32. The Send button 22 in the message composition window 20 of FIG. 3 may be responsive to input from a user such as a mouse click, keyboard input, or any other type of input. The different areas 24, 26, 28, 30, 32 in the message composition window 20 display different portions of an email message. For example, the To area 24 includes text that indicates email addresses to which the email message is addressed, while the message body area 32 displays the contents of the body of the email message. Each or any of these different areas 24, 26, 28, 30, 32 may be editable based on user input. Changes to the contents of these areas 24, 26, 28, 30, 32 may change the corresponding portion of the email message.

FIG. 3 shows an example wherein the "2 Bottles" link beneath the picture of the Wine One and described above with reference to FIG. 2 is selected. The To area 24 indicates that the message is addressed to sales@company.com. The Subject area 30 indicates that the subject of the message is "Purchase from Wine Shop." The CC area 26 and BCC area 28 are blank. Continuing the example of FIG. 3, Wine One product has a product identifier of "0005" and John Smith has a customer identifier of "0777." Accordingly, the message body area 32 includes the text "ProductID0005" and "CustomerID0777." To indicate that the user has selected the purchase of two bottles, the message body area 32 includes the text "Qty0002." Further, the message body area 32 includes the text "CampaignID0033," indicating that the order is associated with an email campaign with an identifier of "0033."

In an instance where a different link from the message body area 16 of FIG. 2 is selected, the display areas 24, 26, 28, 30, 32 in the message composition window 20 may include contents specified by the selected different link. For example, in an instance where a link related to Wine Two is selected, the message body area may not include the text "ProductID0005," but may include text that indicates the corresponding identifier for Wine Two.

Figure 4:
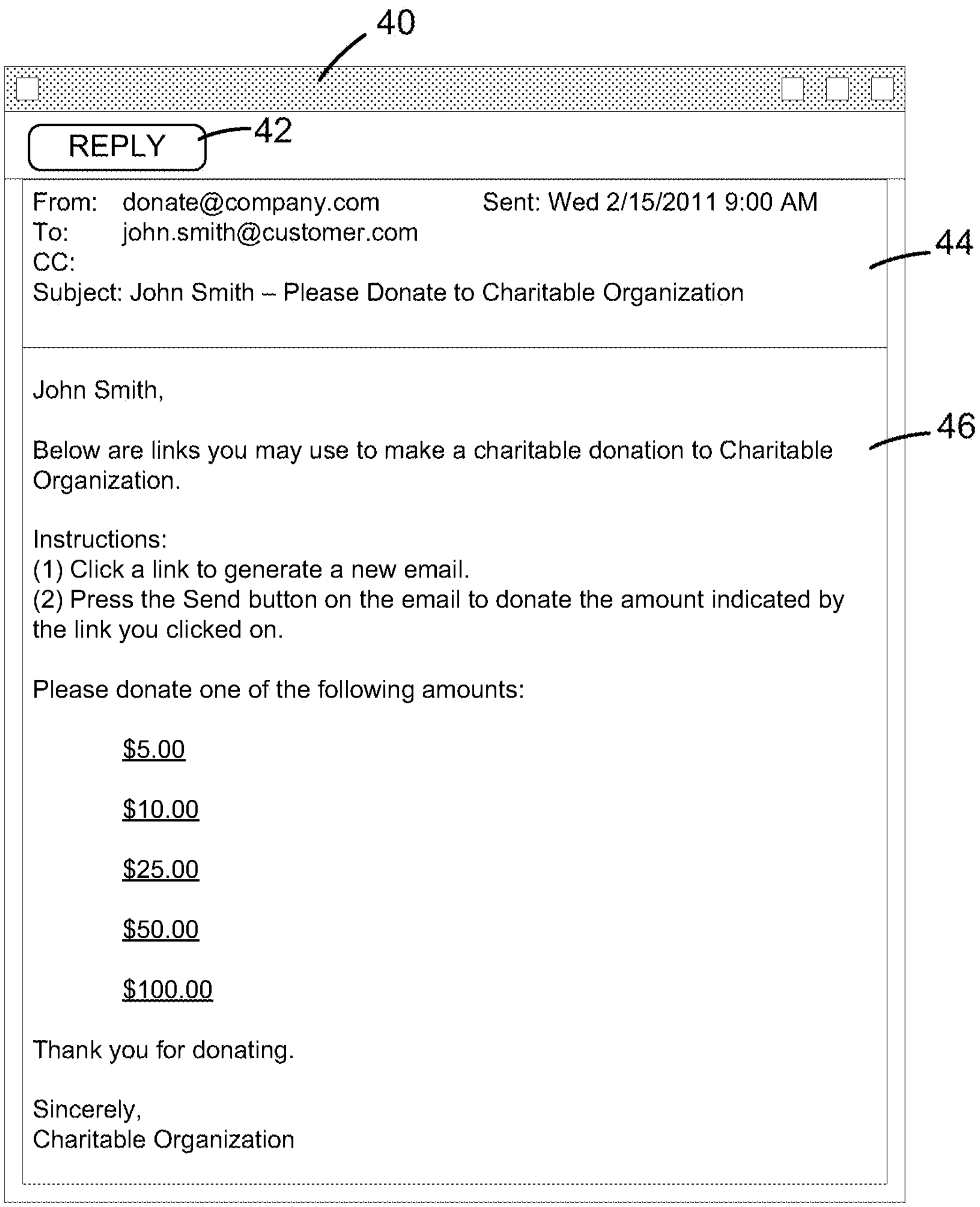
FIG. 4 illustrates an advertisement email message that solicits a donation.

FIG. 4 illustrates an advertisement email message that solicits a donation. FIG. 4 shows an email display window 40 that may be used by the email client module of customer device 150 to display a second example email message from the message processing module. The email display window 40 includes a Reply button 42, a control area 44, and a message body area 46. These display areas 42, 44, 46 may possess similar and/or analogous characteristics and/or perform similar functionality as corresponding display areas 12, 14, 16 in the message composition window 20 of FIG. 2. According to the example of FIG. 4, the control area 44 shows that the sender of the message has the email address "donate@company.com." This is an email address that may be associated with an account used by the e-commerce system 140 for the communication of email messages. Further to this example, the control area 44 shows that the email address of the example recipient of the message (John Smith) is "john.smith@customer.com."

As shown in FIG. 4, the message body area 46 of the email display window 40 may display an example email message that shows information related the solicitation of donations for an example non-profit organization ("Charitable Organization"). The message body area 46 also includes mailto links, such as the "$5.00," "$10.00," "$25.00," "$50.00," and "$100.00" links. These links may possess similar and/or analogous characteristics, and/or include similar and/or analogous information, as the mailto links described above with reference to FIG. 2. The "$5.00" link describes an email message that, if received by the e-commerce system 140, will indicate to the e-commerce system 140 that John Smith may like to donate $5.00 to Charitable Organization. Similarly, the "$10.00," "$25.00," "$50.00, and $100.00" links describe email messages with corresponding information for $10.00, $25.00, $50.00, and $100.00 donations, respectively.

The email client module of customer device 150 may receive a user input that indicates that one of the links displayed in the message body area 46 is selected. The email client module of customer device 150 may, in response to this user input, generate and display an order email message as specified by the selected link.

Figure 5:
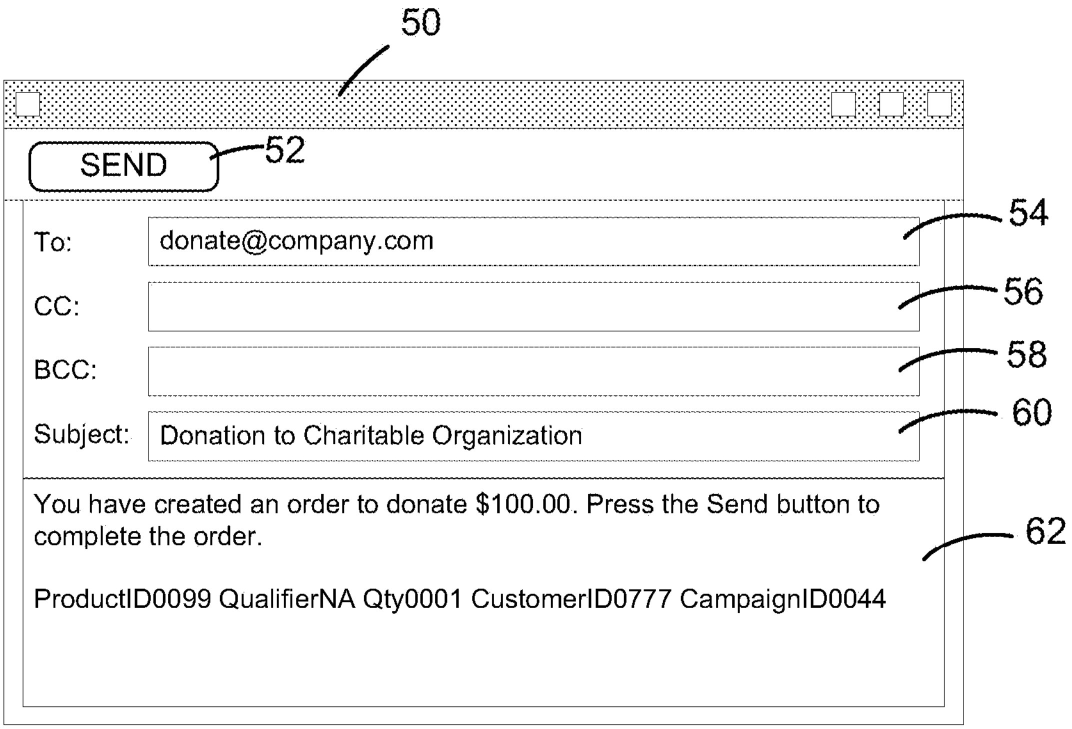
FIG. 5 illustrates an email message for ordering a donation.

FIG. 5 illustrates an email message for ordering a donation. FIG. 5 shows an example message composition window 50 that may be displayed in response to a selection of a link from the message body area 46 of the email display window 40 of FIG. 3. The message composition window 50 of FIG. 5 may include a Send button 52, a To area 54, a CC area 56, a BCC area 58, a Subject area 60, and a message body area 62. These display elements 52, 54, 56, 58, 60, 62 may possess similar and/or analogous characteristics and/or perform similar functionality as corresponding display areas 22, 24, 26, 28, 30, 32 in the message composition window 20 of FIG. 3.

FIG. 5 shows an example wherein the "$100.00" link from the message body area 46 of the email display window 40 of FIG. 4 is selected. The To area 54 indicates that the message is addressed to donate@company.com. The Subject area 60 indicates that the subject of the message is "Donation to Charitable Organization." The CC area 56 and BCC area 58 are blank. According to this example, a donation of $100.00 to Charitable Organization has a product identifier of "0099," and John Smith has a customer identifier of "0777." Accordingly, the message body area 62 includes the text "ProductID0099" and "CustomerID0777." Further, the message body area 62 includes the text "CampaignID0044," indicating that the order is associated with an email campaign with an identifier of "0044."

The email client module of customer device 150 may send the generated order email message to the e-commerce system 140. This may be performed in response to input from a user of the customer device 150. As one example, the email client module of customer device 150 may, in response to a selection of the Send button 52 in the message composition window 50 of FIG. 5, transmit an order email message based on the contents of the fields 54, 56, 58, 60, 62 in the message composition window 50. As another example, the email client module of customer device 150 may, in response to a selection of the Send button 52 in the message composition window 50 of FIG. 5, transmit an order email message based on the contents of the display areas 54, 56, 58, 60, 62 in the message composition window 50.

A token may be located within the To: Cc: or Bcc fields of a response email. This token may take the form of a short token, for example. The e-commerce system 140 may generate the short token that is located in the To: field, or any other field, for example, as part of the email address. When the vendor system 130 requests that the token generator 141 generate a mailto link with the identifiers and token, the token generator 141 may generate a "short lookup token" and the "long token" encoded with the identifiers. The short lookup token may be associated with the long token and may be required or otherwise needed to access the information in the long token index. The short token index may be sent in an email to the customer device 150 as a mailto link. The customer using the customer device 150 selects the mailto link and generates the response email addressed to the e-commerce system 140. The short lookup token may be built into the address of the response email. The short lookup token may be of the form:

payment-id-74E4DE00-51E2-457B-8C0B-648640EF232D@payments.atpay.com, for example.

When the customer using customer device 150 sends the email and the e-commerce system 140 receives the email and authenticates the customer's email address, the e-commerce system 140 may also determine using the short lookup token included in email address of the e-commerce system 140 the long token associated therewith. When the long token is determined, the e-commerce system 140 decodes the long token and processes the payment. The use of the short token allows for a less convoluted field in the email address and eliminates the need for the token to be located in the body field.

The short token lookup is not necessarily required in this system, as the transactions may be processed with the long token either in the address field, another field, or in the body of the response email. The use of the short lookup token may lessen the one-to-one correlation between the token and the actual offer and/or transaction details, as that correlation may be more direct in the long token embodiment.

It should be understood that many variations are possible based on the disclosure herein. Although features and elements are described above in particular combinations, each feature or element may be used alone without the other features and elements or in various combinations with or without other features and elements.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

A system is described that uses the e-commerce system 140 to process emails for making payments. As shown in FIG. 1, a single payment processing system is described. The present invention's flexibility and control offers vendors a choice of which payment processor to use. Additionally, a payment processor may be a vendor and offer payments by email. Payment processors and payment gateways may integrate the e-commerce system 140 and restrict access to other payment processors and gateways.

Figure 6A:
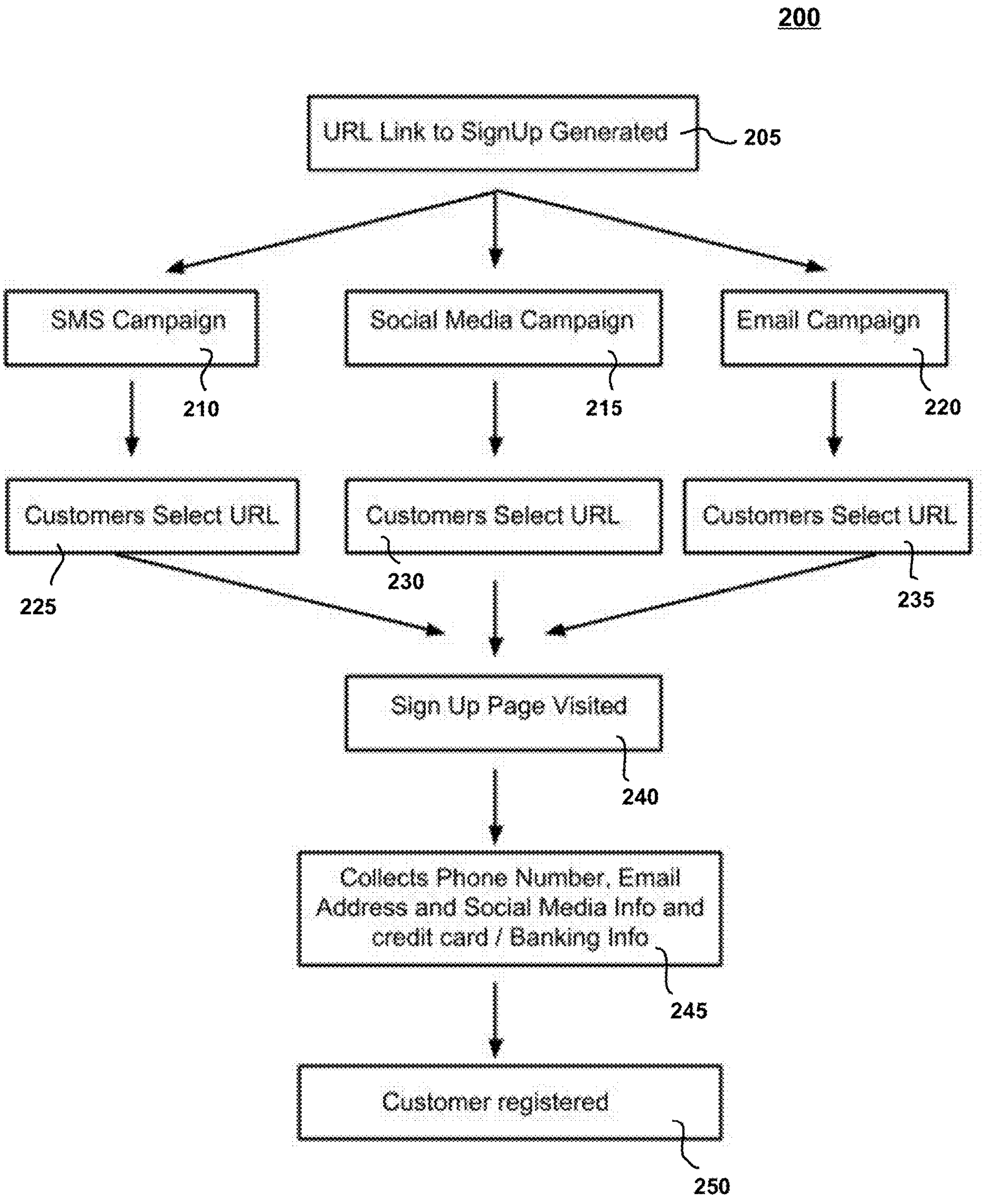
FIG. 6A is a diagram illustrating a signup process that collects various information required for multiple fail safe confirmations.

FIG. 6A is a diagram 200 illustrating a signup process that collects various information required for multiple fail safe confirmations. The e-commerce system 140 uses an array of media that drives the customer to a single URL sign up 205. The URL signup 205 link may be shared with the customer multiple ways such as email 220, SMS 210 or social media 215 campaign. In an implementation, only one of these confirmations is required. The signup process collects required information used across multiple payment methods. For example, when presented with the SMS campaign 210, the customer may select the URL 225, when presented with the social media campaign 215, the customer may select the URL 230, and when presented with the email campaign 220, the customer may select the URL 235. Selection of the URLs 225, 230, 235 may direct the customer's browser to a sign-up page 240. The customer may provide an identifier, such as a phone number, email address, and social media information, for example, and credit card and banking information 245. The customer is then registered 250.

Multiple identifiers may be required, for example, email address, phone number, and social media account login information. When these identifiers are submitted by the customer the identifiers are associated with that customer and used for cross-referencing. In standard web-based checkouts the customer may be required to input all of their information, including credit card or bank account information, each time they wish to make a payment or they may be required to enter a username and password in order to log on and access payment information to complete a payment. The disclosed invention allows the customer to generate an account, storing multiple identifiers that may be accessed by the e-commerce system. The customer confirms the payment or secure login via one of various methods that may only be accessed via those networks and accounts.

Figure 6B:
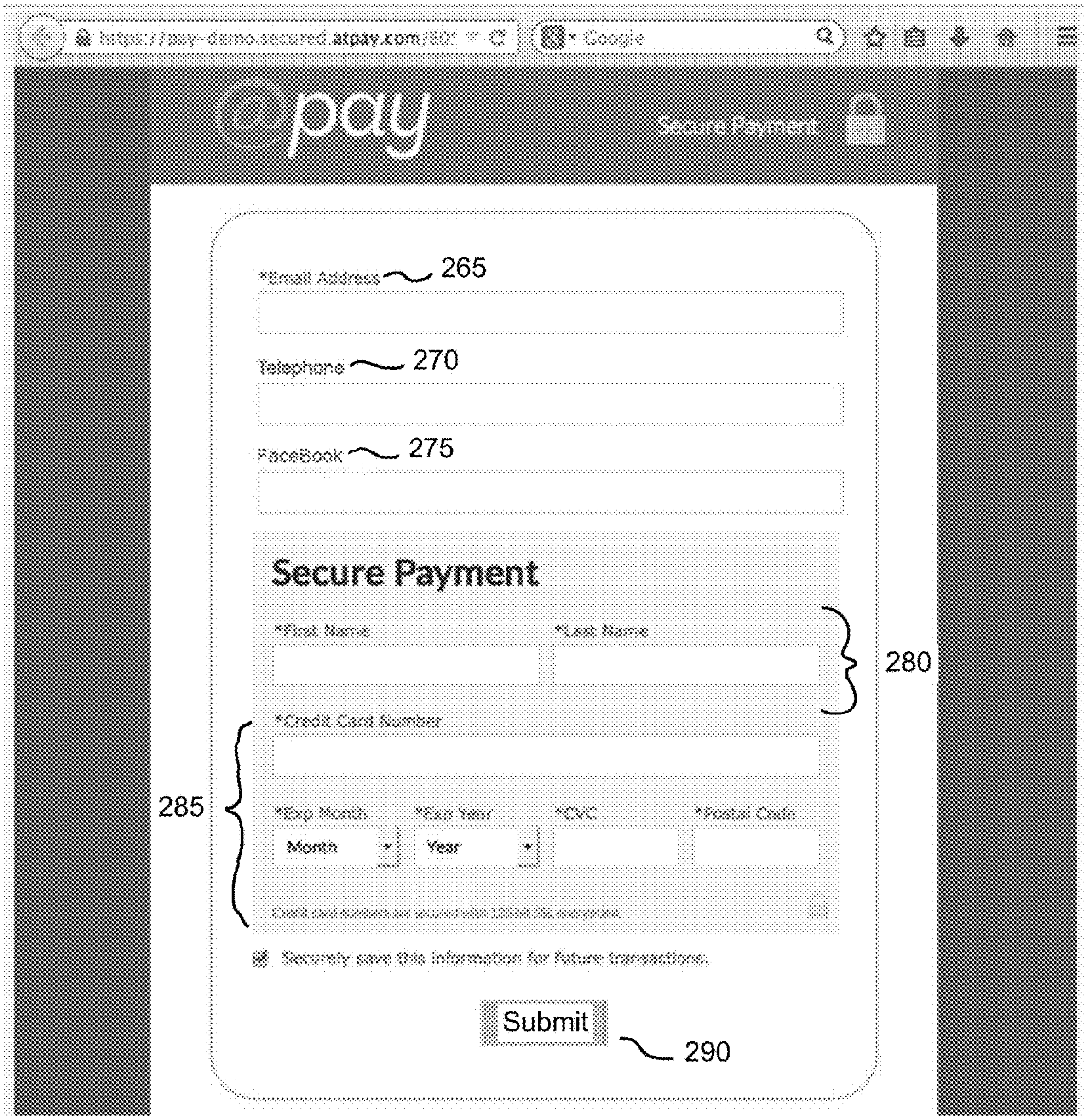
FIG. 6B is an illustration of an example signup that captures a customer's information.

FIG. 6B is an illustration of an example signup 260 that captures a customer's information. Signup 260 may capture the user's email address 265, telephone 270, Facebook information 275, as well as customer's name 280 and credit card information 285. Once the customer enters the information, the customer may submit the information via a SUBMIT button 290.

Figure 7A:
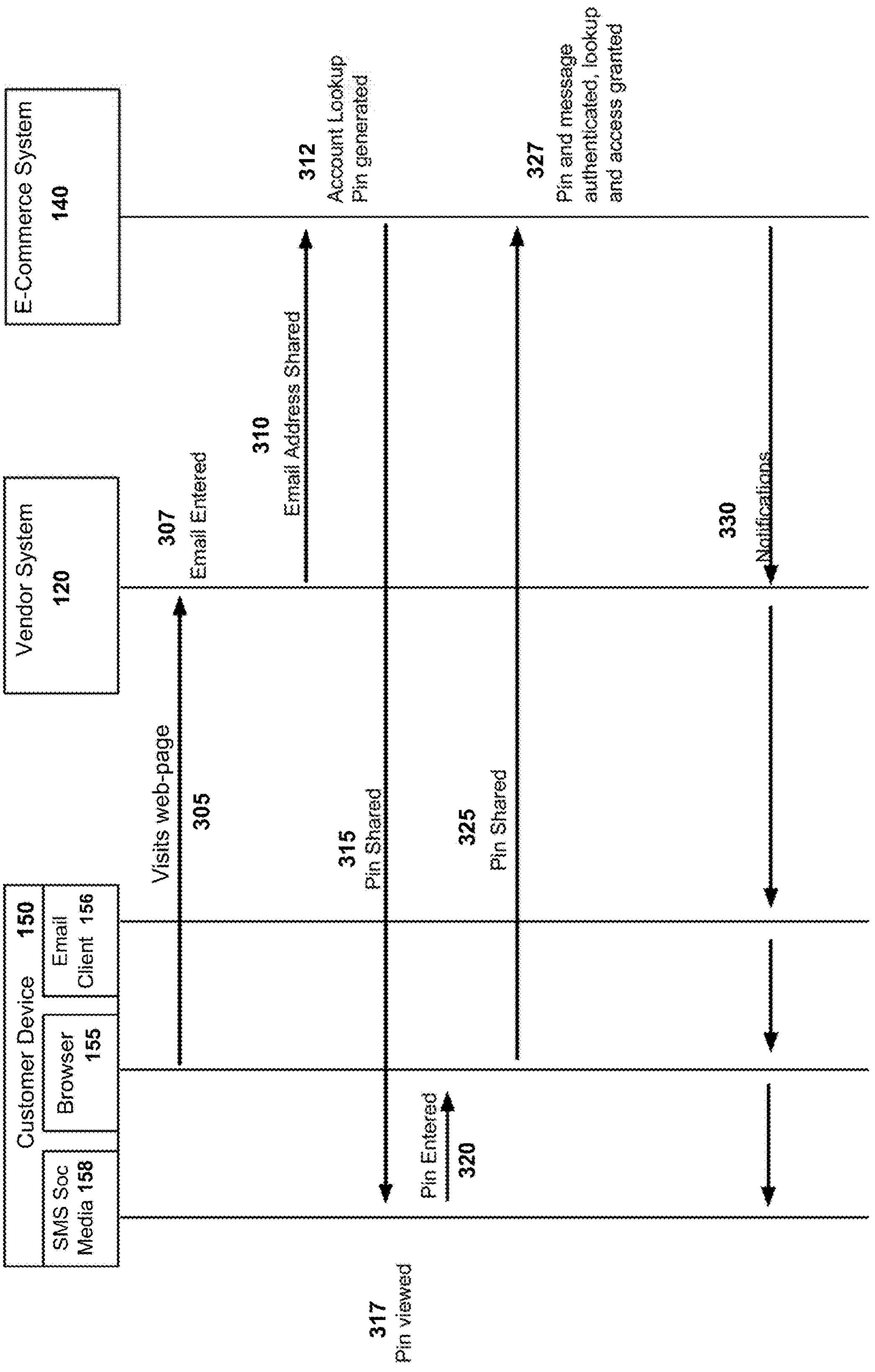
FIG. 7A is a transactional flow diagram illustrating the process of a customer using a web-based checkout with a secret pin that is messaged via SMS, email, or social media.

FIG. 7A is a transactional flow diagram 300 illustrating the process of a customer using a web-based checkout with a secret pin that is messaged via SMS, email, or social media. In this example, the identifier may be a phone number and the message may be an email.

A customer using the customer device 150 may access a web-based checkout at step 305 and total a number of items in their shopping cart. The total is generated in the vendor system 120, but may be totaled in a different system such as the e-commerce system 140 or third party. The customer selects the option to pay. The customer is prompted to enter their email address or any identifier known to the e-commerce system 140 such as phone number or social media information or credit card codes. The customer submits the email address at step 307. The customer payment request and email address are shared with the e-commerce system 140 at step 310. The e-commerce system 140 receives the request and authenticates the IP address of the customer. The e-commerce system 140 looks up the customer's account using the email address provided and generates an SMS message based on the phone number stored and associated with the customer. The e-commerce system 140 generates a secret pin associated with the customer and that requested transaction at step 312. The secret pin is included in the SMS message. The secret pin may only be valid for a limited time. If the customer is not authenticated or is missing information or does not have an account, the customer may be navigated to a signup page on the web-based checkout. If all requirements are met the e-commerce system 140 shares the secret pin with the customer via the SMS message at step 315. The customer views the SMS on the customer device 150 and retrieves the secret pin via the SMS social media unit 158 at step 317. The customer, using the customer device 150, enters the secret pin on the web-based browser 155 page at step 320 and submits the pin to confirm payment. The customer, via the web-based checkout, shares the secret pin with the e-commerce system 140 at step 325. The e-commerce system 140 authenticates the IP address and the secret pin and processes the payment at step 327. Notifications are sent out at step 330. Alternatively or additionally, a pin may be used to grant access to a secure online account. Access to a secure online account may be limited to time or activity or may require the customer to log off. The above described process may be required each time the customer accesses the secure account.

Figure 7B:
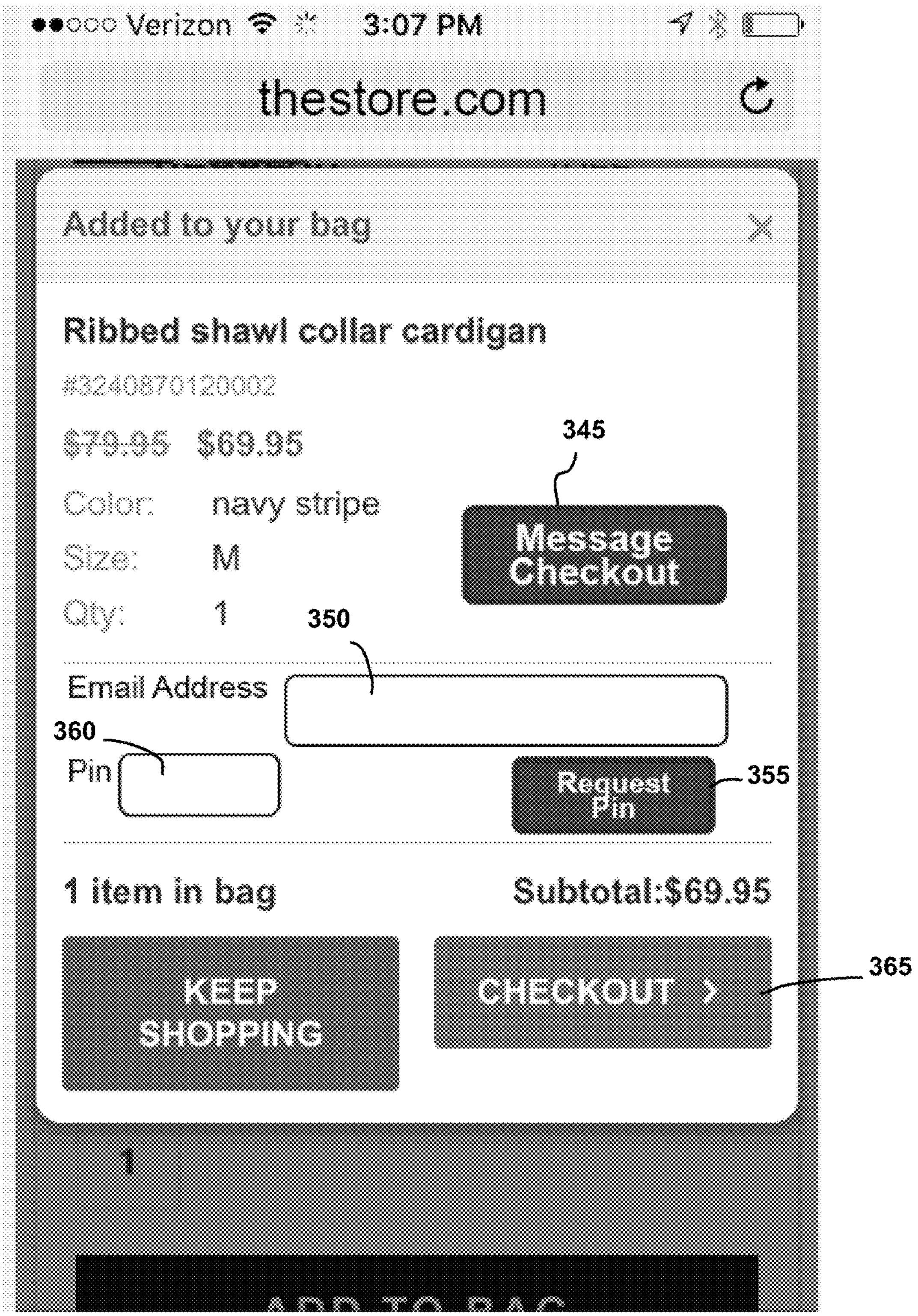
FIG. 7B is an illustration of a web-based checkout example.

FIG. 7B is an illustration of a web-based checkout example 340. In this example, the total is generated in the vendor system 120. The customer selects the option to pay using the Message Checkout 345. The customer is prompted to enter their email address in input block 350. The customer submits the email address using the Request Pin 355. Once the customer submits the request, they may be prompted to check their SMS account for a secret pin as set forth in greater detail above. An input for the secret pin may be visible and accessible in a browser 155 on the customer device 150 using the PIN input block 360. The customer, using the customer device 150, enters the secret pin on the web-based browser 155 page via PIN input block 360 and submits the pin using Checkout 365 to confirm payment.

Figure 7C:
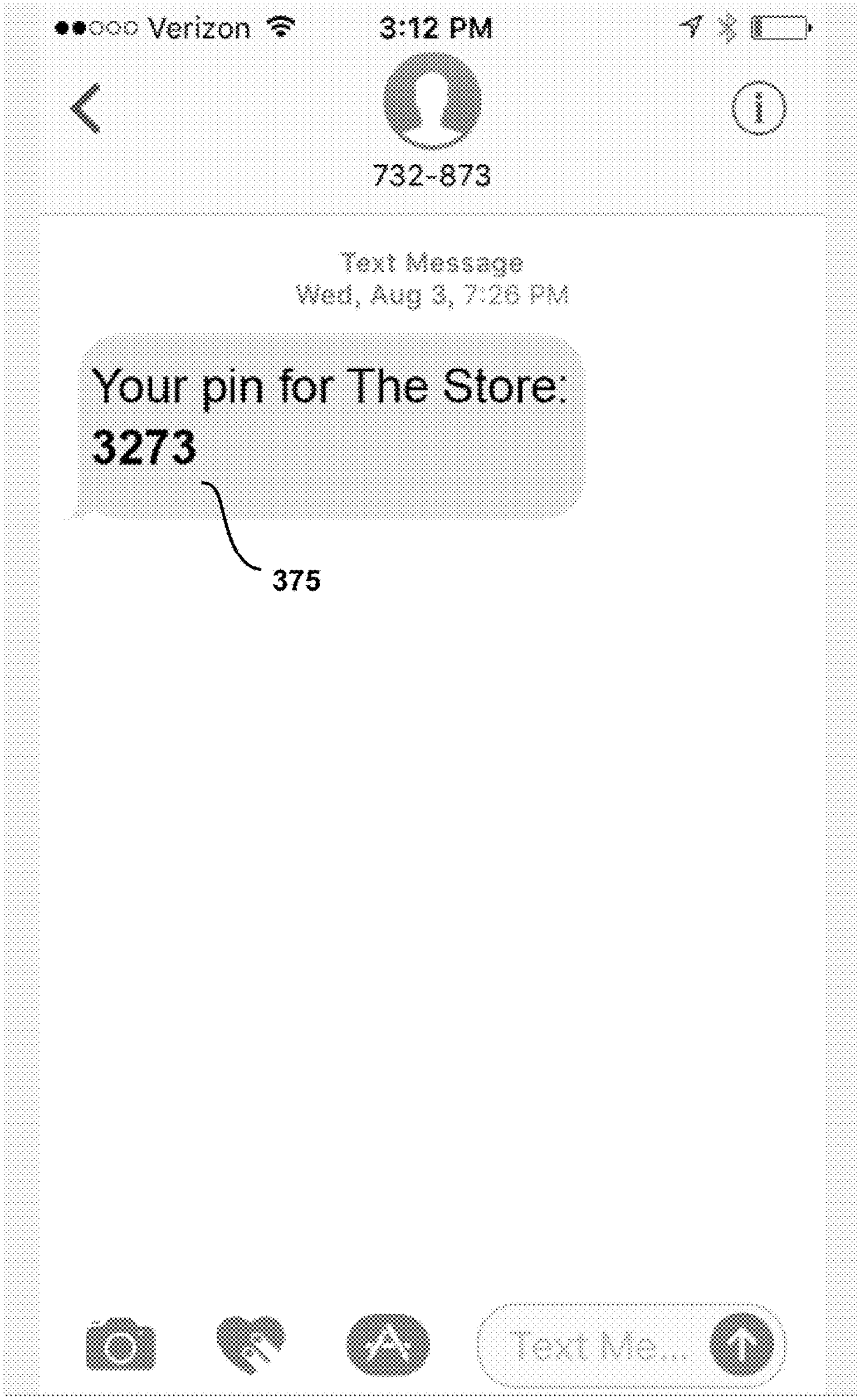
FIG. 7C is an illustration of an example SMS of a secret pin.

FIG. 7C is an illustration of an example SMS 370 of a secret pin 375.

Figure 8A:
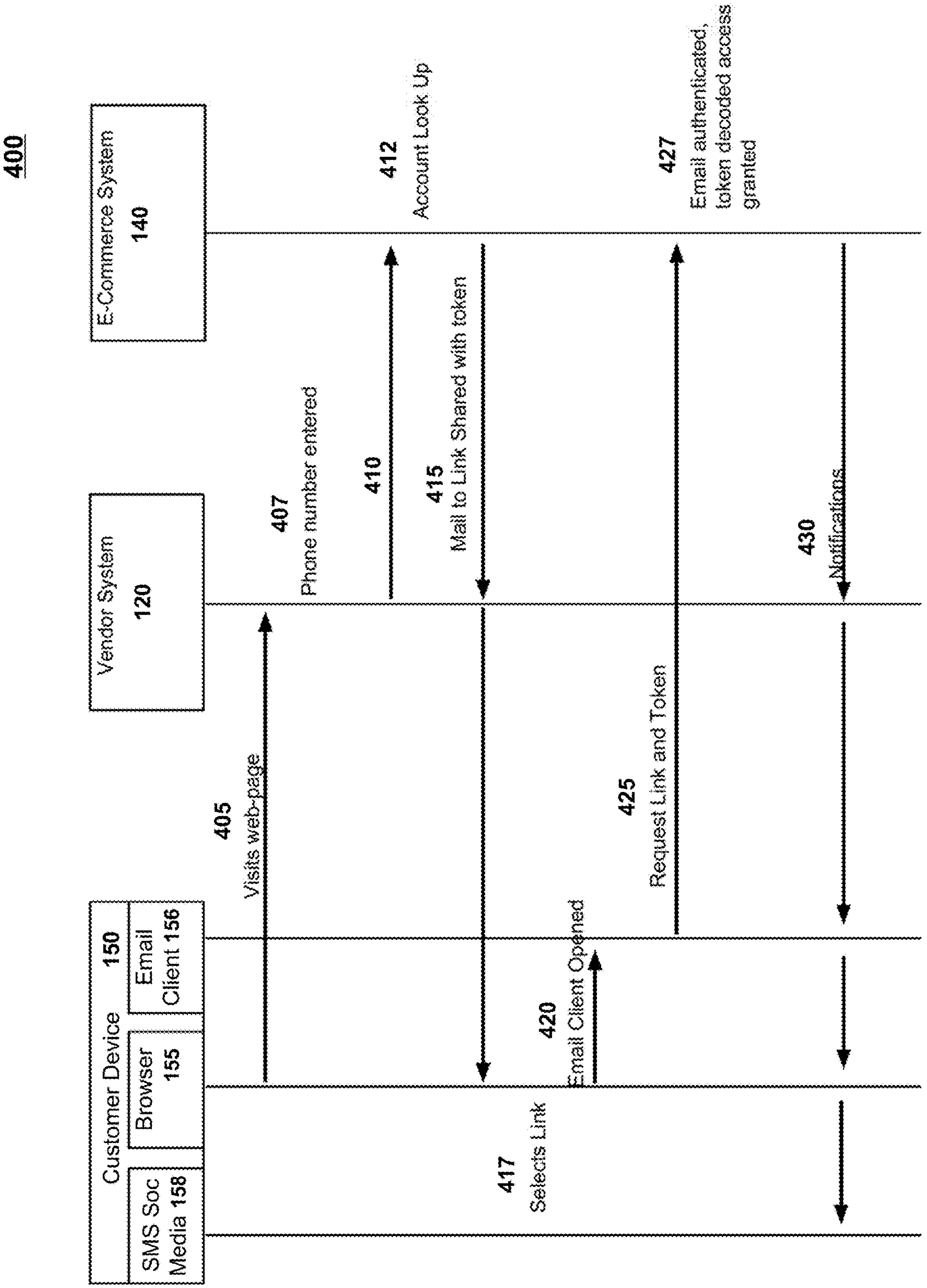
FIG. 8A is a transactional flow diagram illustrating the process where a customer uses a web-page interface to input an identifier to request secure access or confirm a payment.

FIG. 8A is a transactional flow diagram 400 illustrating the process where a customer uses a web-page interface to input an identifier (for example, a phone number) to request secure access or confirm a payment. A customer using the customer device 150 accesses a web-based checkout and totals a number of items in their shopping cart at step 405. In this example the total is generated in the vendor system 120 but may be totaled in a different system such as the e-commerce system 140 or third party. The customer selects the option to pay. The customer is prompted to enter their phone number at step 407. The phone number may be any identifier, such as, an email address, social media information, or credit card codes. The customer payment request and phone number are shared with the e-commerce system 140 at step 410. The e-commerce system 140 receives the request and authenticates the IP address of the customer. The e-commerce system 140 looks up the customer's account using the phone number at step 412 and generates a mailto link and token associated with the customer and the transaction. If the customer is not authenticated or the lacks the required information or does not have an account, the customer may be navigated to a signup page on the web-based checkout. If all requirements are met the e-commerce system 140 shares the mailto link and token with the customer on the web-based checkout at step 415. The mailto link and the token may be behind an image of a button.

The customer, using the customer device 150, selects the mailto link at step 417 and triggering the email client 156 to open at step 420. Using the email client 156, a response email is generated and is addressed to the e-commerce system 140. The response email holds the token. The token may be anywhere in the email. In an example the token is part of the email address. The customer sends the email sharing the token with the e-commerce system 140 at step 425. The e-commerce system 140 authenticates the email and decodes the token at step 427. If requirements are not met the customer may receive an email with a URL link that navigates them to a web page to collect required information to complete the transaction. If requirements are met the e-commerce system 140 processes the payment and notifications are sent out at step 430. Alternatively or additionally, if all requirements are met the customer may be granted access to a secure online account. Access to a secure online account may be limited to time or activity or may require the customer to log off. The above described process may be required each time the customer accesses the secure account.

Figure 8B:
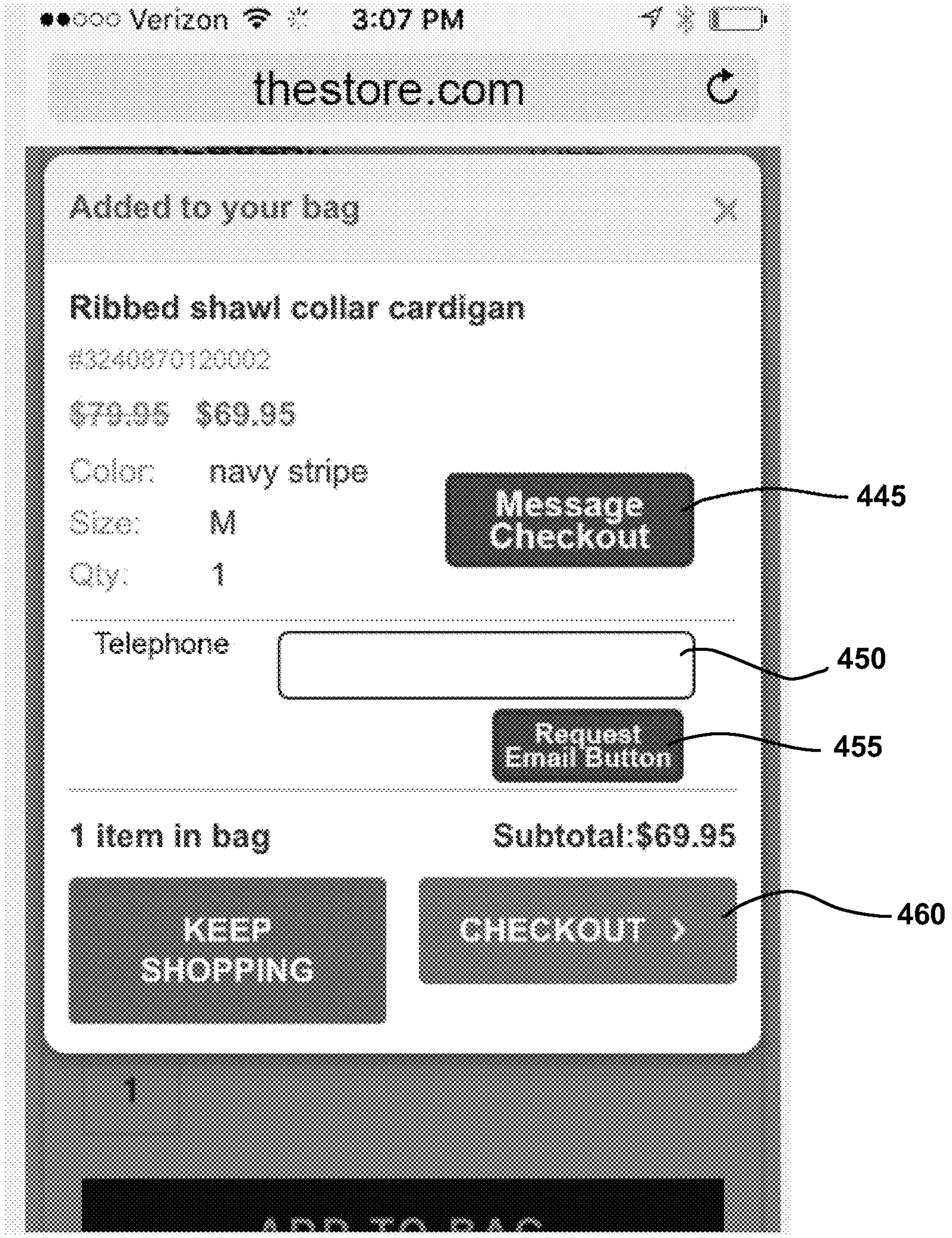
FIG. 8B is an illustration of a web-based checkout example.

FIG. 8B is an illustration of a web-based checkout example 440. The customer selects the option to pay using the Message Checkout 445. The customer is prompted to enter their phone number in input block 450. The customer payment request and phone number are shared with the e-commerce system 140 using the Request Email Button 455. The mailto link and token are shared with the customer on the web-based checkout. The mailto link and the token may be behind an image of a button, such as Checkout 460.

Figure 8C:
FIG. 8C is an illustration of an example response email.

FIG. 8C is an illustration of an example response email 470. The response email holds the token 475. The token may be anywhere in the email. In this example the token is part of the email address 475. The customer sends the email sharing the token with the e-commerce system 140 to submit payment.

Figure 9A:
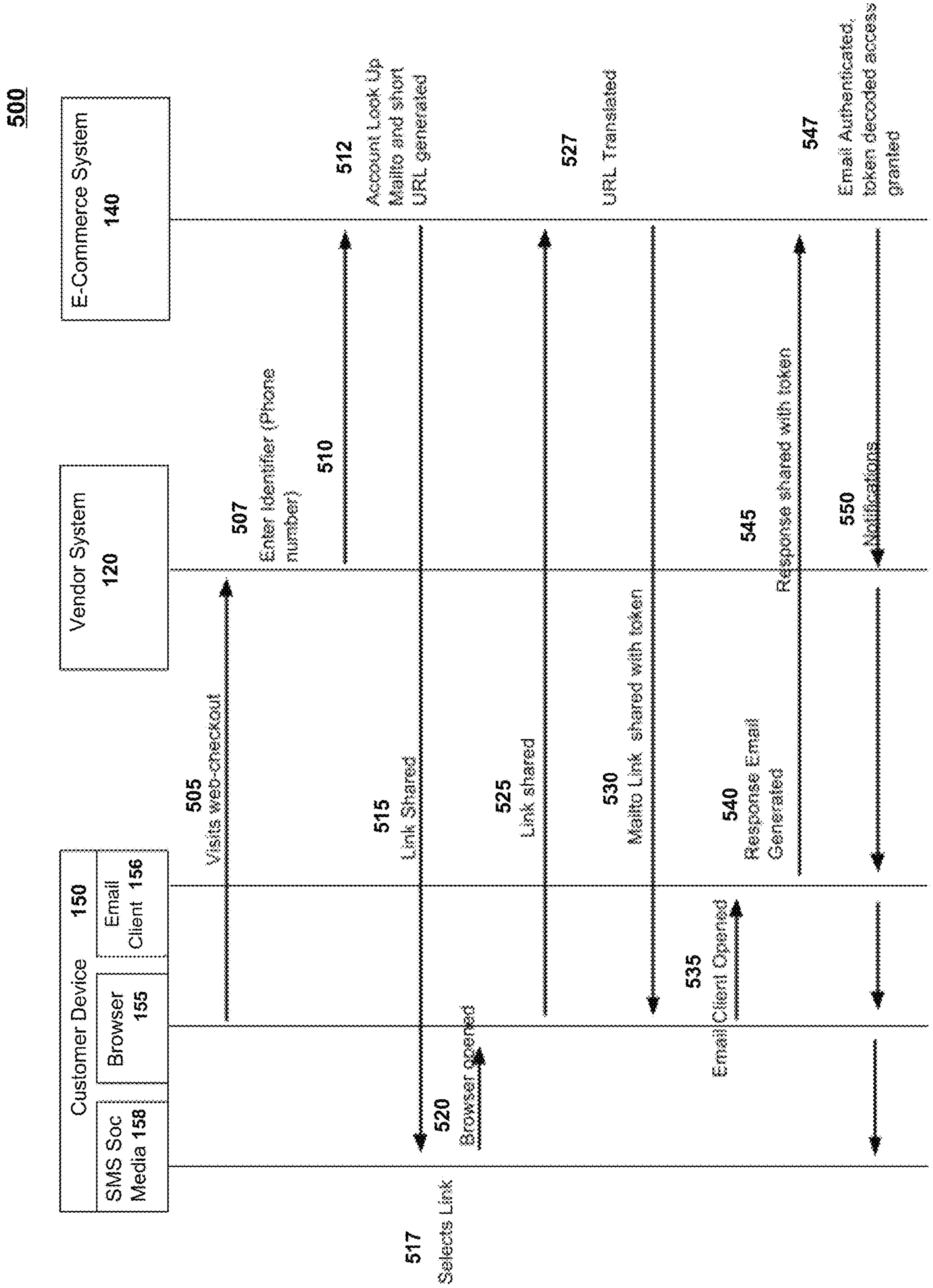
FIG. 9A is a transactional flow diagram illustrating the process where a customer uses a web-page interface to input an identifier to request an offer SMS with a short URL link that generates an email response message to grant access to a secure webpage or process a payment.

FIG. 9A is a transactional flow diagram 500 illustrating the process where a customer uses a web-page interface to input an identifier (for example, a phone number) to request an offer SMS with a short URL link that generates an email response message to grant access to a secure webpage or process a payment. While this example specifically utilizes the short URL link, and other examples herein specify the use of a mailto link, for example, the short URL link and other links may be used and substituted for one another in the provided examples while specific reference is made to the discussion with respect to FIG. 1 herein above.

A customer using the customer device 150 accesses a web-based checkout at step 505 and totals a number of items in their shopping cart. In this example the total is generated in the vendor system 120 but may be totaled in a different system such as the e-commerce system 140. The customer selects the option to pay. The customer may be prompted to enter their phone number at step 507. The phone number may be any identifier such as an email address, social media information, or credit card codes. The customer payment request and phone number are shared with the e-commerce system 140 at step 510. The web checkout browser 155 window may prompt the customer to check their SMS account. The e-commerce system 140 receives the request and authenticates the IP address of the customer. The e-commerce system 140 looks up the customer's account using the phone number provided and generates a mailto link and token associated with the customer and the transaction at step 512. The e-commerce system 140 also associates the mailto link and token with a short URL link. If the customer is not authenticated, is missing information, lacks the required information, or does not have an account, the customer may be navigated to a signup page on the web-based checkout. If all requirements are met the e-commerce system 140 shares the short URL link with the customer via an SMS message to the phone number associated with the customer at step 515.

The customer, using the customer device 150, selects the short URL link at step 517 and triggers the web browser 155 unit to open at step 520. The short URL link is shared with the e-commerce system 140 at step 525. The e-commerce system 140 authenticates the short URL link. The e-commerce system 140 looks up the mailto link and token associated with the short URL link at step 527. The mailto link and token are shared with customer's web browser 155 at step 530. The mailto link triggers the email client 156 to open at step 535. Using the email client 156, a response email is generated at step 540 and addressed to the e-commerce system 140.

The customer sends the email, sharing the token with the e-commerce system 140 at step 545. The e-commerce system 140 authenticates the email and decodes the token at step 547. If requirements are not met the customer may receive an email with a URL link that navigates them to a web page to collect required information to complete the transaction. If requirements are met the e-commerce system 140 processes the payment and notifications are sent out at step 550. Alternatively or additionally, when the e-commerce system 140 authenticates the email and decodes the token, and if all requirements are met, the customer may be granted access to a secure online account. Access to a secure online account may be limited to time or activity or may require the customer to log off. The above described process may be required each time the customer accesses the secure account.

Figure 9B:
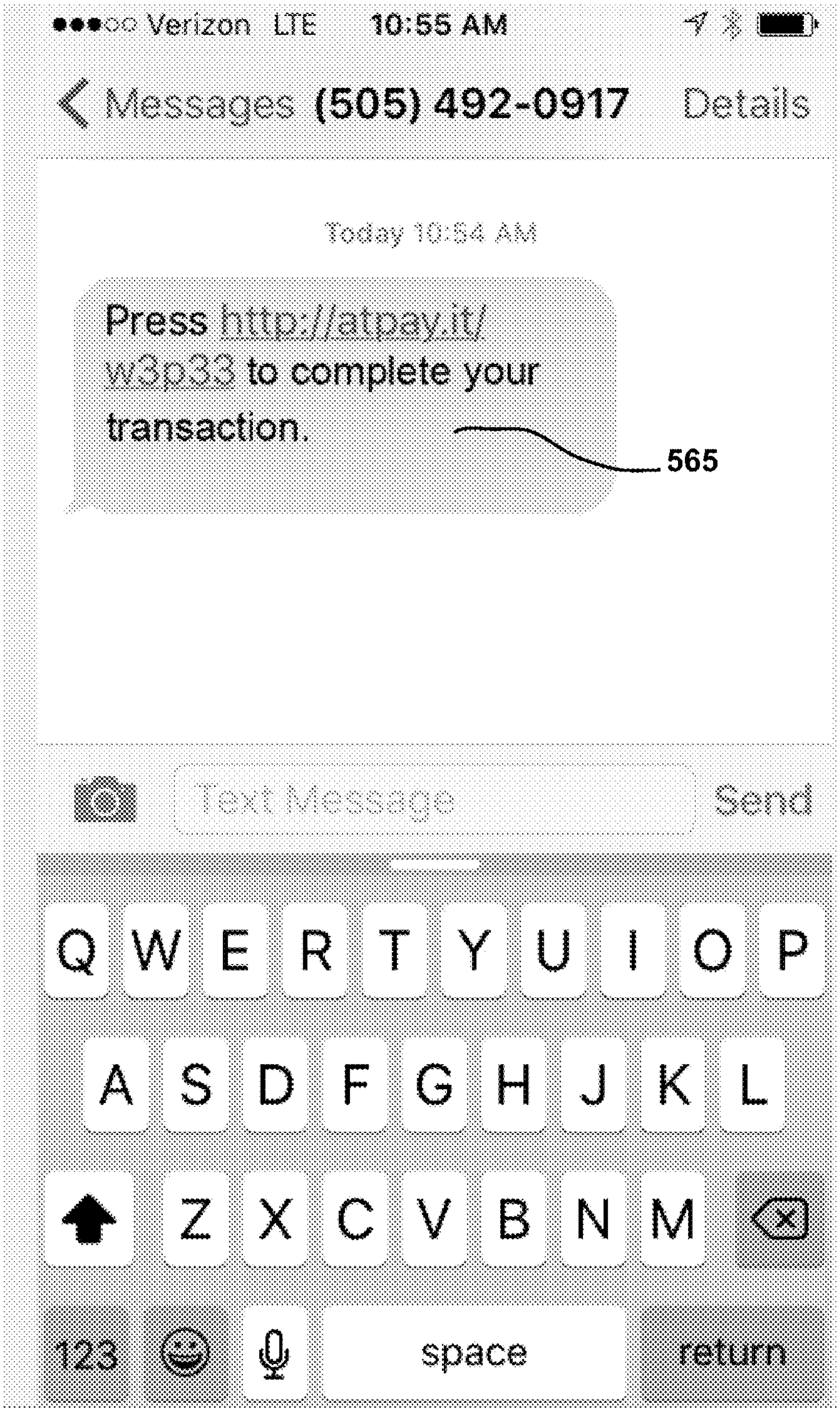
FIG. 9B is an illustration of an example SMS message with a short URL link.

FIG. 9B is an illustration 560 of an example SMS message with a short URL link 565. The link may be behind an image of a button. (Not depicted) The short URL link may be used in other formats such as social media, email or Quick Response codes.

Figure 9C:
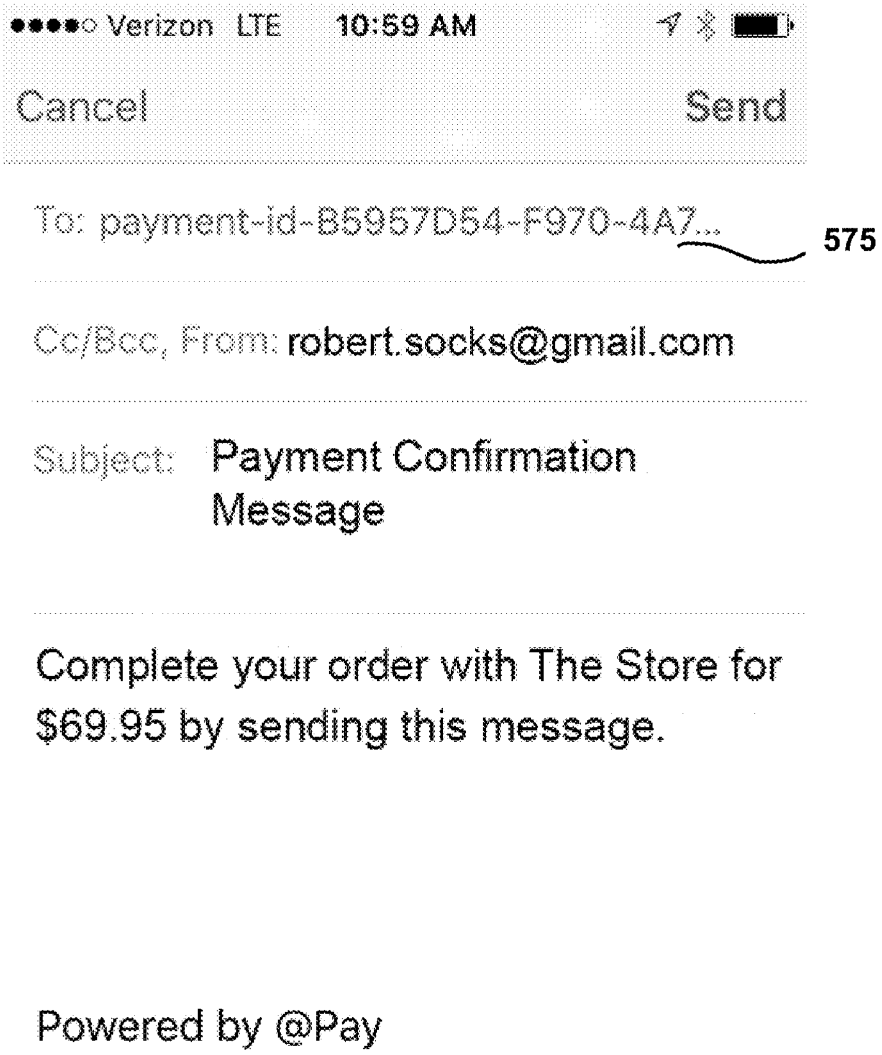
FIG. 9C is an illustration of an example response email for confirming a payment.

FIG. 9C is an illustration of an example response email 570 for confirming a payment. The response email holds the token 575. The token may be anywhere in the email. In this example the token is in the email address field 575.

The above examples focus on the mailto links sent in SMS, HTTP, or social media to generate email messages to confirm transactions. The following method allows for the automatic generation of response messages in a format other than email or a URL browser page. This example focuses on SMS or social media. The 'textto:' format may include a string of characters that define regions of the SMS message, alternative destinations, and may carry a token. Disclosed is an alternative to the mailto link in the form of a link defined to trigger formats other than email or URL browser pages. This may require updates in syntax which introduce new Uniform Resource Identifier (UDI) schemes in accessing other formats such as SMS. These protocols may be adopted across the internet or integrated only in the applications used by the vendor 120, the e-commerce system 140, the customer device 150, or other parties contingent on the completion of the transaction. The protocols allow for the accessing of a live link such as a 'textto:2125341235' or 'smsto: 2125341235.' The selection of the live link may trigger the opening of the SMS application and generation and/or sending of an SMS from other applications and online sources. The string of characters used to identify the SMS function may vary from this example. The string of data may also define the content of the message. Additionally, or alternatively, specific triggers may be generated for social media messages or posts such as 'socto:facebook' or 'fb: post' or 'tweetto'. This change in syntax would allow for greater variety in transitioning between media.

Figure 10:
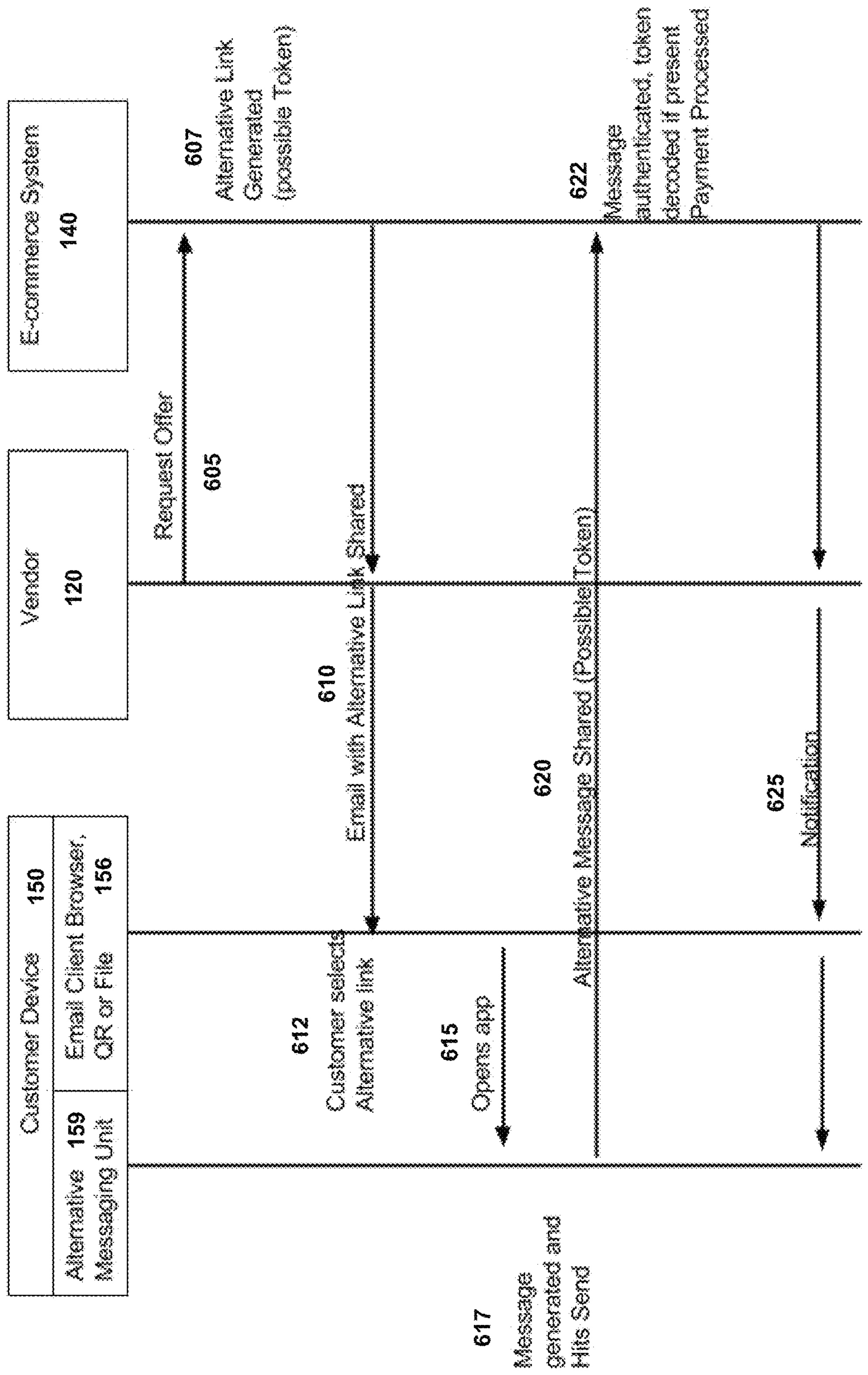
FIG. 10 is a transactional flow diagram describing how a transaction may be made with an alternative link, such as a textto link that triggers the generation of an SMS from other applications.

FIG. 10 is a transactional flow diagram 600 describing how a transaction may be made with an alternative link, such as a textto link that triggers the generation of an SMS from other applications. The vendor 120 requests an offer message from the e-commerce system 140 at step 605. The vendor 120 may provide details of the offer and the e-commerce system 140 may store those details. The offer requires the generation of an alternative link format described above such as a textto link. The e-commerce system 140 generates the link that includes the phone number of the e-commerce system 140 and may include a token at step 607. The e-commerce system 140 may share the textto link with the users through various methods such as email, social media, SMS, QR Code, barcode, NFC chip, or a web browser 155 at step 610. This may also be done by sharing the link with the vendor 120 and the vendor 120 sharing the link in various forms of messaging and advertising. There may be more than one textto link. Each textto link may be associated with a different offer. The textto link may be behind an image.

The user application recognizes the textto link format and when the user selects the link at step 612 it triggers the SMS application to open up on the user device at step 615. This generates at step 617 an SMS response message with phone number of the e-commerce system 140. The SMS may have a token included in the message. To complete the transaction the user selects 'send' and shares the token, pin, or link with the e-commerce system 140 at step 620. The e-commerce system 140 authenticates the message and if a token is present, decodes the token at step 622. The e-commerce system 140 may perform a lookup based on the user's phone number or other identifier to identify the account. If the user does not have an account, the phone number is not recognized, or if the requirements are not met the e-commerce system 140 my share a URL link with the user that navigates them to a sign up co-page and or checkout. If all requirements are met then the transaction is processed and notifications are sent out at step 625.

Although this example focuses on SMS, social media applications may be substituted. This diagram illustrates a process where the new link form is used to transition between mediums and applications when selected by the customer, however, the link may be equally useful in generating a response message within its own messaging format. For example, a smsto or textto link may be sent in an SMS format to facilitate another SMS response message but to a different phone number. The new phone number may be a destination which assumes customer's the intention to pay.

While the present examples and descriptions have focused on ones of secure logins, payment processing, secure transactions, and granting access to secure webpages, each example could be modified to focus on one or more of these objectives as would be evidenced by the myriad of examples.

The system described herein is only one version of the system and method and the invention is not limited to this configuration. Certain processes may be located in different areas. The use of chips and their devices may be used in multiple ways to produce transmissions of the required information. Other chips used in card technology, for example EMV chips, may work in concert with radio wave transmission technology described above. Other chips used in card technology, for example MEMS Microelectromechanical Systems, may work in concert with radio wave transmission technology described above. The design of the NFC chip and device may be exclusive to the e-commerce system either allowing for greater functionality, scalable outcomes or security.

It should be understood that many variations are possible based on the disclosure herein. Although features and elements are described above in particular combinations, each feature or element may be used alone without the other features and elements or in various combinations with or without other features and elements.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed:

1. A method for improving security of a computer network using Simple Mail Transfer Protocol (SMTP) and a Quick Response (QR) Code, the method comprising:

receiving, by a processor of a vendor system, a request to perform a transaction from a user, wherein the transaction grants access to a secure webpage;

obtaining, by the processor of the vendor system, an identifier of the user;

causing, by the processor of the vendor system, an e-commerce system to generate the QR code by sharing the identifier of the user and details of the transaction with the e-commerce system, wherein:

the QR code contains a token and a link for the transaction, the token is generated based on the identifier of the user and the details of the transaction, and the link when activated generates an email response that is transmitted to the e-commerce system via SMTP and contains the token;

transmitting, by the processor of the vendor system, the QR code to the user;

receiving, by the processor of the vendor system, a notification from the e-commerce system that indicates that the user is authorized to perform the transaction in response to the transmitting, wherein the e-commerce system determines that the user is authorized by authenticating the email response generated by the link based on the token contained in the email response; and permitting, by the processor of the vendor system, the user to access the secure webpage in response to receiving the notification from the e-commerce system.

2. The method of claim 1, wherein the authenticating of the email response further includes at least one of DomainKeys Identified Mail (DKIM) or Sender Policy Framework (SPF) protocols.

3. The method of claim 1, further comprising sending, by the processor of the vendor system, a confirmation that the transaction has been completed to the user.

4. The method of claim 1, wherein the link includes the token.

5. The method of claim 1, wherein the QR code includes the token as part of the link.

6. The method of claim 1, wherein the link is a mailto link or a Uniform Resource Locator (URL) link.

7. The method of claim 1, wherein the link comprises a short Uniform Resource Locator (URL) link associated, by the e-commerce system, with a mailto link and the token.

8. The method of claim 1, wherein authenticating the email response comprises determining, by the e-commerce system, that a sender domain of the email response is authenticated using at least one DomainKeys Identified Mail (DKIM) record or Sender Policy Framework (SPF) record.

9. The method of claim 1, wherein the e-commerce system determines that the user is authorized to perform the transaction by decoding the token contained in the email response and determining that the decoded token corresponds to the identifier of the user and the details of the transaction.

10. A non-transitory computer readable medium storing instructions for improving security of a computer network using Simple Mail Transfer Protocol (SMTP) and a Quick Response (QR) Code, the instructions when executed by one or more processors of a vendor system, cause the one or more processors to collectively execute a method comprising:

receiving a request to perform a transaction from a user, wherein the transaction grants access to a secure webpage;

obtaining an identifier of the user;

causing an e-commerce system to generate the QR code by sharing the identifier of the user and details of the transaction with the e-commerce system, wherein:

the QR code contains a token and a link for the transaction, the token is generated based on the identifier of the user and the details of the transaction, and the link when activated generates an email response that is transmitted to the e-commerce system via SMTP and contains the token;

transmitting the QR code to the user;

receiving a notification from the e-commerce system that indicates that the user is authorized to perform the transaction in response to the transmitting, wherein the e-commerce system determines that the user is authorized by authenticating the email response generated by the link based on the token contained in the email response; and permitting the user to access the secure webpage in response to receiving the notification from the e-commerce system.

11. The non-transitory computer readable medium of claim 10, wherein the authenticating of the email response is performed using at least one of DomainKeys Identified Mail (DKIM) or Sender Policy Framework (SPF) protocols.

12. The non-transitory computer readable medium of claim 10, wherein the method further comprises:

sending a confirmation that the transaction has been completed to the user.

13. The non-transitory computer readable medium of claim 10, wherein the link is a mailto link or a Uniform Resource Locator (URL) link.

14. The non-transitory computer readable medium of claim 10, wherein the QR code includes the token as part of the link.

15. A system for improving security of a computer network using Simple Mail Transfer Protocol (SMTP) and a Quick Response (QR) Code, the system comprising:

a memory;

a communication interface; and one or more processors communicatively coupled to the memory and the communication interface, wherein the one or more processors are collectively configured to:

receive, using the communication interface, a request to perform a transaction from a user, wherein the transaction grants access to a secure webpage;

obtain, using the memory, an identifier of the user;

cause, using the communication interface, an e-commerce system to generate the QR code by sharing the identifier of the user and details of the transaction with the e-commerce system, wherein:

the QR code contains a token and a link for the transaction, the token is generated based on the identifier of the user and the details of the transaction, and the link when activated generates an email response that is transmitted to the e-commerce system via SMTP and contains the token;

transmit, using the communication interface, the QR code to the user;

receive, using the communication interface, a notification from the e-commerce system that indicates that the user is authorized to perform the transaction in response to the QR code being transmitted, wherein the e-commerce system determines that the user is authorized by authenticating the email response generated by the link based on the token contained in the email response; and permit, using the communication interface, the user to access the secure webpage in response to receiving the notification from the e-commerce system.

16. The system of claim 15, wherein the link is a mailto link or a Uniform Resource Locator (URL) link.

17. The system of claim 15, wherein the link is a short Uniform Resource Locator (URL) link.

18. The system of claim 15, wherein the authenticating of the email response further includes at least one of DomainKeys Identified Mail (DKIM) or Sender Policy Framework (SPF) protocols.

19. The system of claim 15, wherein the one or more processors are further collectively configured to:

send a confirmation that the transaction has been completed to the user.

20. The system of claim 15, wherein the link includes the token.

* * * * *